United States Patent
Bortoff et al.

(10) Patent No.: US 10,895,412 B2
(45) Date of Patent: Jan. 19, 2021

(54) SYSTEM AND METHOD FOR POWER OPTIMIZING CONTROL OF MULTI-ZONE HEAT PUMPS

(71) Applicant: Mitsubishi Electric Research Laboratories, Inc., Cambridge, MA (US)

(72) Inventors: Scott Bortoff, Brookline, MA (US); Daniel Burns, Wakefield, MA (US); Christopher Laughman, Waltham, MA (US); Hongtao Qiao, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 174 days.

(21) Appl. No.: 16/151,465

(22) Filed: Oct. 4, 2018

(65) Prior Publication Data

US 2020/0018531 A1  Jan. 16, 2020

Related U.S. Application Data

(60) Provisional application No. 62/696,438, filed on Jul. 11, 2018.

(51) Int. Cl.
*F25B 49/02* (2006.01)

(52) U.S. Cl.
CPC .......... *F25B 49/02* (2013.01); *F25B 2500/18* (2013.01); *F25B 2600/0253* (2013.01);
(Continued)

(58) Field of Classification Search
CPC .............. F25B 49/022; F25B 2700/172; F25B 2700/1931; F25B 2700/21;
(Continued)

(56) References Cited

U.S. PATENT DOCUMENTS 4,205,381 A   5/1980  Bitterli et al.
4,269,261 A *  5/1981  Kountz .............. F24D 19/1039
                                                     237/2 A
(Continued)

FOREIGN PATENT DOCUMENTS

CN       103017290 B   9/2011
EP         2253897 A1  11/2010

OTHER PUBLICATIONS

Quansheng Zhang., "Modeling, Energy Optimiziation and Control of Vapor Compression Refrideration Systems for Automotive Applications." Dissertation, Graduate Program in Mechanical Engineering. The Ohio State University., 2014.

*Primary Examiner* — Nelson J Nieves
(74) *Attorney, Agent, or Firm* — Gennadiy Vinokur; James McAleenan; Hironori Tsukamoto

(57) ABSTRACT

Systems and methods for a vapor compression system including primary actuators, secondary actuators, primary sensors that provide a primary set of system outputs, and secondary sensors that provide a secondary set of system outputs. A primary controller receives the primary set of system outputs, and produces a primary set of control inputs for the primary actuators, to regulate one or more zone temperatures to set-points and to regulate one or more critical process variables to set-points. A secondary controller receives the secondary set of system outputs, and produces a secondary set of control inputs, to minimize an overall system power consumption. The secondary inputs may include set-points to the primary controller. The primary outputs may include estimates of critical process variables that are used as inputs to the secondary controller.

19 Claims, 12 Drawing Sheets

(52) U.S. Cl.
CPC ....... *F25B 2600/11* (2013.01); *F25B 2600/25* (2013.01); *F25B 2700/172* (2013.01); *F25B 2700/1931* (2013.01); *F25B 2700/1932* (2013.01); *F25B 2700/21* (2013.01)

(58) Field of Classification Search
CPC ...... F25B 2700/1932; F25B 2700/2104; F25B 2600/25; F25B 2600/0253; F25B 2600/11; F25B 2600/025; F25B 2600/2513; F25B 2600/111; F25B 2600/112; F24F 11/54
See application file for complete search history.

(56) References Cited

U.S. PATENT DOCUMENTS

| | | | | |
|---|---|---|---|---|
| 4,364,237 | A | * | 12/1982 | Cooper ................... F25B 13/00 62/160 |
| 4,916,642 | A | * | 4/1990 | Kaiser ..................... A01G 9/26 700/278 |
| 5,735,134 | A | * | 4/1998 | Liu ......................... F25B 49/02 62/183 |
| 8,909,359 | B2 | | 12/2014 | Seem |
| 9,175,869 | B2 | * | 11/2015 | Castillo ................... F24F 11/30 |
| 10,230,240 | B2 | * | 3/2019 | Barooah ................. F24F 11/30 |
| 2005/0278040 | A1 | | 12/2005 | Itoh et al. |
| 2006/0112701 | A1 | * | 6/2006 | Dykstra .................. F25B 49/02 62/132 |
| 2008/0072611 | A1 | * | 3/2008 | Ahmed ................... F25B 49/02 62/175 |
| 2011/0041532 | A1 | * | 2/2011 | Preston ................. F25B 49/027 62/186 |
| 2015/0057813 | A1 | * | 2/2015 | Cho ........................ F24F 11/62 700/277 |
| 2017/0004171 | A1 | | 1/2017 | Leonard et al. |
| 2017/0023272 | A1 | * | 1/2017 | Erickson .................. F24F 3/044 |
| 2017/0089598 | A1 | | 3/2017 | Wallace et al. |
| 2017/0241658 | A1 | * | 8/2017 | Salsbury ................. F24F 11/83 |
| 2018/0004172 | A1 | | 1/2018 | Patel et al. |
| 2018/0267515 | A1 | * | 9/2018 | House ................ G05B 19/4188 |
| 2018/0313563 | A1 | * | 11/2018 | Turney .................... F24F 11/65 |
| 2019/0293314 | A1 | * | 9/2019 | Benosman ............... F24F 11/46 |
| 2019/0316802 | A1 | * | 10/2019 | Alanqar ............. G05B 13/0265 |
| 2019/0353384 | A1 | * | 11/2019 | Laughman ......... G05D 23/1902 |
| 2020/0033016 | A1 | * | 1/2020 | Ogura ..................... F24F 11/30 |

\* cited by examiner

SYSTEM AND METHOD FOR POWER OPTIMIZING CONTROL OF MULTI-ZONE HEAT PUMPS

FIELD

The present disclosure relates generally to control for vapor compression systems, and more particularly to control systems and methods for optimizing a performance metric of the vapor compression systems.

BACKGROUND

Vapor compression systems, such as heat pumps, refrigeration and air conditioning systems, are widely used in industrial and residential applications. The introduction of variable speed compressors, variable position valves, and variable speed fans has improved the flexibility of the operation of such systems. However, there is a need to improve the energy efficiency of conventional vapor compression systems by controlling these components properly, that has not yet been addressed by the heating and cooling industries.

A combination of commanded inputs to conventional vapor compression systems can move a particular amount of heat, however at least one disadvantage of these various combinations of command inputs is the consumption of different amounts of power. Therefore, there is a need to operate the vapor compression system using a combination of inputs that minimizes power consumption while also simultaneously achieving other control objectives, which the heating and cooling industries have yet addressed.

Minimizing power consumption is conventionally attempted using set-point schedules or extremum-seeking controllers. A set-point schedule is a function that takes as input a set of first variables such as compressor speed or outside air temperature, and computes set-point references for one or more scheduled variables that are under feedback control, such as the compressor discharge temperature or evaporator superheat temperature. The set-point schedule is conventionally constructed such that the scheduled variables are driven to values that are predicted to minimize power for a given set of conditions. However, at least one disadvantage is that the set-point schedule requires calibration, which is time-consuming and expensive, especially as the number of variables increases, as is the case when the number of indoor units increases, for example. Further, this type of conventional approach may achieve a minimum power only at specific values of the heat load disturbances. Therefore, these conventionally scheduled set-points are suboptimal, and the vapor compression system is not driven to a minimum value of power consumption for all conditions. Furthermore, this type of conventional approach is an open-loop method, and therefore the set-point schedules suffer from a lack of robustness with respect to model uncertainty.

An alternative to conventional set-point schedules for minimizing power is conventional extremum-seeking controllers. These conventional extremum-seeking controllers actively experiment with the device under control by applying a perturbation or dither signal to one or more inputs and measuring the resulting perturbations in the performance metric, such as power consumption. These perturbations are averaged over a time interval to produce an estimate of the gradient of the performance metric. This local estimate of the gradient is then used to steer the average value of the inputs in the direction of the gradient that minimizes the performance metric.

U.S. Pat. No. 8,694,131 teaches that a perturbation-based conventional extremum seeking controller can be configured to modify the operation of a vapor compression system such that energy-optimal combinations of actuators are used to direct the operation of vapor compression systems. While the perturbation-based conventional extremum seeking method can achieve the optimum of a convex performance metric without relying on a model, this conventional method suffers, for many reasons, for example, from slow convergence rates. Because the objective of the conventional extremum-seeking controller is to find an optimal steady-state operating point, the conventional extremum-seeking controller controls the plant in a quasi-steady manner, i.e., without exciting the plant dynamics. Otherwise, phase information between the applied control signals and the measurements due to the plant dynamics cannot be distinguished from the phase information due to the sinusoidally perturbed measurement of the performance metric.

If the slowest, and therefore dominant, time constant associated with the dynamics of the vapor compression system is called $\tau_{plant}$, then the perturbation period $\tau_{perturb}$ must be slower (larger time constant): $\tau_{perturb} \gg \tau_{plant}$. Further, the conventional extremum-seeking controller must average over several perturbation periods in order to obtain an accurate estimate of the average gradient, and since the extremum-seeking occurs on the time-scale of this averaged gradient, the convergence rate of the conventional extremum seeking controller is at least two time-scales slower than the plant dynamics. Because the dominant time constant of the vapor compression system is typically on the order of tens of minutes, the conventional extremum seeking controller can take several hours to converge to the operating point that minimizes power, which is a major disadvantage. And since the disturbances acting on the vapor compression system, such as heat loads, are known to have faster dynamics, the optimal operating point can change before the perturbation extremum-seeking controller converges, another disadvantage. A further disadvantage, among many disadvantages is that the power consumption must be measured by sensors As a result, the slow convergence property and sensing requirements of perturbation-based extremum seeking represents a barrier to the solution of real-time optimization of the performance of vapor compression systems.

Accordingly, there is a need for a real-time feedback control algorithm that automatically adjusts inputs such that the power consumption is rapidly driven to its minimum value, without the need for a time-scale separation or a perturbation dither signal, and without the need to measure the power consumption with sensors, and is robust with respect to unmeasured disturbances that may have spectral content within the bandwidth of the system dynamics.

SUMMARY

Embodiments of the present disclosure relate to control systems and methods for optimizing a performance metric for vapor compression systems.

Some embodiments of the present disclosure relate to systems and methods that command one or more control input(s) to a vapor compression system, which can result in minimizing the power consumption, among other aspects. Further, the present disclosure shall enable rapid convergence to the power-minimal operating condition in such a manner that typical disturbances do not interfere with the attainment of such optimal operation.

Another aspect of the present disclosure is to use feedback to command automatically the vapor compression system to an operating condition that achieves simultaneously the goals of zone temperature regulation and power minimization.

Some embodiments of the present disclosure are based on the realization that the relationship between a subset of control inputs and power consumption is convex, and that for a given set of conditions, a set of control input values is power-optimal. It is further realized that if an inner feedback loop is configured to control a primary set of control inputs for purposes of achieving zone temperature regulation, then an outer-loop power-optimizing feedback loop can manipulate a secondary set of inputs to attain power minimization of the aggregate closed-loop system.

Some embodiments of the present disclosure can be applied to optimize one or more vapor compression system actuators directly, or by optimizing one or more reference inputs to the primary feedback controller. In either configuration, all actuator commands achieve their values that minimize the power consumption and also regulate zone temperatures, despite the fact that only a subset of actuators are directly manipulated by the power-optimizing controller. This is because the vapor compression system is in feedback with a multivariable feedback controller that simultaneously controls all inputs to reject disturbances, including a disturbance that can be viewed as originating from the secondary, power-optimizing controller.

Some embodiments are based on the realization that mathematical models of the compressor and fan speed that predict power consumption of a compressor or a fan may be modified, and the modifications may be used for power-optimizing feedback control. Further, algorithms that control the operation of the vapor compression system can achieve several objectives simultaneously, including: (1) move heat from a low-temperature space to a high-temperature space in order to provide heating, cooling or refrigeration, while regulating process variables such as zone temperatures to set-points, (2) enforce constraints such as maintaining key temperatures and pressures within prescribed limits in order to protect the equipment, and (3) minimize power consumption.

Some embodiments of the present disclosure are based on the realization that the gradient of power consumption with respect to a secondary set of output variables may be computed analytically, and this gradient can be used in feedback with a steady-state model of a part of the vapor compression system to adjust secondary inputs to the closed-loop system that drives the system to the minimum power consumption exponentially fast. In some embodiments of this present disclosure, the secondary set of output variables include measurements of the compressor suction and discharge pressures, the compressor speed, or the fan speeds. In some embodiments of this present disclosure, the secondary set of output variables include estimates of the compressor suction and discharge pressures, the compressor speed, or the fan speeds.

The present disclosure discloses a control system for a vapor compression system that may contain one or more zones that achieves independent zone temperature control, regulates some critical process variables which may include compressor suction or discharge temperature(s), for example, and minimizes the system power consumption for constant values of references and disturbances. The control system is a cascade consisting of an inner feedback loop that, in one embodiment, may be designed using loop-shaping techniques for robust performance, and a power-minimizing outer loop that uses gradient descent with a modified mathematical model of system power consumption to minimize power consumption automatically. At least one key insight, among others, is to compute analytically, or symbolically, the gradient of a power consumption function, and use this as a nonlinear element in a feedback loop that includes integral action. The convergence of power consumption to its optimal, minimal value is exponential and does not require any time-scale separation, which are significant advantages over extremum-seeking prior art. Further, the exponential stability property implies a degree of robustness with respect to model uncertainty and unmeasured disturbances, meaning the feedback loop will remain stable if there is sufficiently small plant uncertainty, and the system is driven to its power-minimizing condition regardless of the value of unmeasured disturbances.

According to an embodiment of the present disclosure, a vapor compression system includes a set of primary actuators and a set of secondary actuators. A set of primary sensors provides a primary set of system outputs. A set of secondary sensors provides a secondary set of system outputs. A hardware memory includes executable programs and data. A primary controller receives the primary set of system outputs, and produces a primary set of control inputs for the set of primary actuators, to regulate one or more zone temperatures to set-points and to regulate one or more critical process variables to set-points. A secondary controller receives the secondary set of system outputs, and produces a secondary set of control inputs, to minimize an overall system power consumption, wherein the secondary controller uses an executable program from memory to compute a gradient of a power consumption function, a steady-state gain from the secondary control inputs to the secondary system outputs, and a compensator that includes integral action. An output interface to output the secondary set of control inputs to one or a combination of some of the secondary actuators or some of the set-points to the primary controller, to regulate the one or more zone.

According to another embodiment of the present disclosure, a method for vapor compression system is disclosed that includes receiving from a set of primary sensors, a primary set of system outputs by a primary controller, wherein the primary controller produces a primary set of control inputs for a set of primary actuators to regulate one or more zone temperatures to set-points, and to regulate one or more critical process variables to set-points. Receiving from a set of secondary sensors, a secondary set of system outputs, by a secondary controller, wherein the secondary controller produces a secondary set of control inputs for a set of secondary actuators, to minimize an overall system power consumption. Wherein the secondary controller uses an executable program stored in a memory, to compute a gradient of a power consumption function, a steady-state gain from the secondary control inputs to the secondary system outputs, and a compensator that includes integral action. Outputting, via an output interface, the secondary set of control inputs to one or a combination of, some of the secondary actuators, or some of the set-points to the primary controller, to minimize an overall system power consumption.

According to another embodiment of the present disclosure, a method a non-transitory computer readable storage medium embodied thereon a program executable by a processor for performing a method. The method is for a vapor compression system including receiving from a set of primary sensors via an input interface, a primary set of system outputs by a primary controller. Wherein the primary controller in communication with the input interface produces a primary set of control inputs for a set of primary actuators, to regulate one or more zone temperatures to set-points and to regulate one or more critical process variables to set-points. Receiving from a set of secondary sensors via the input interface, a secondary set of system outputs, by a secondary controller, wherein the secondary controller in communication with the input interface, produces a secondary set of control inputs for a set of secondary actuators, to minimize an overall system power consumption. Wherein the secondary controller uses an executable program stored in a memory, to compute a gradient of a power consumption function, a steady-state gain from the secondary control inputs to the secondary system outputs, and a compensator that includes integral action. Outputting, via an output interface, the secondary set of control inputs to one or a combination of, some of the secondary actuators, or some of the set-points to the primary controller, to minimize an overall system power consumption.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure describes an operation of a vapor compression system in heating mode, wherein heat is pumped from a low temperature heat exchanger in an outdoor space to high temperature heat exchangers in one or more indoor spaces, although it should be understood that the system may be operated in cooling mode by reversing the flow of refrigerant. Additionally, the present disclosure describes a vapor compression system operating to heat or cool spaces or zones occupied by occupants, but the present disclosure may also be applied to vapor compression systems operating as a refrigeration system, cooling or heating secondary fluids such as water, or in other applications with suitable substitutions or reconfigurations of machine endpoints.

Figure 1:
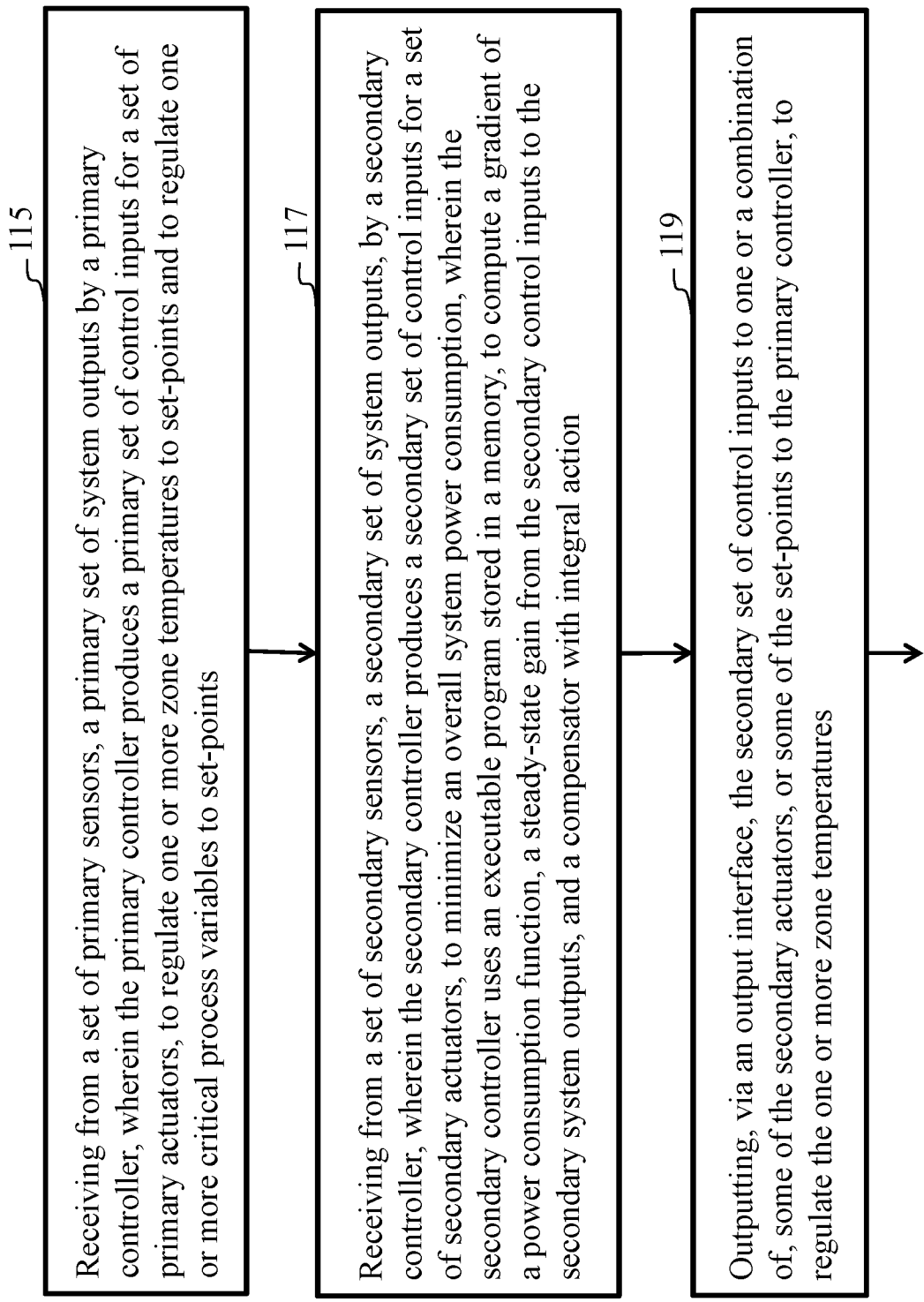
FIG. 1 is a block diagram illustrating steps of a method, according to embodiments of the present disclosure.

FIG. 1 is a schematic illustrating steps of a method, according to embodiments of the present disclosure. Step 115 includes the method receiving from a set of primary sensors, a primary set of system outputs by a primary controller. Wherein the primary controller produces a primary set of control inputs for a set of primary actuators, to regulate one or more zone temperatures to set-points and to regulate one or more critical process variables to set-points.

Step 117 of FIG. 1 includes the method receiving from a set of secondary sensors, a secondary set of system outputs, by a secondary controller. Wherein the secondary controller produces a secondary set of control inputs for a set of secondary actuators, to minimize an overall system power consumption. Wherein the secondary controller uses an executable program stored in a memory, to compute a gradient of a power consumption function, a steady-state gain from the secondary control inputs to the secondary system outputs, and a compensator with integral action.

Step 119 of FIG. 1 includes the method outputting, via an output interface, the secondary set of control inputs to one or a combination of, some of the secondary actuators, or some of the set-points to the primary controller, to minimize an overall system power consumption.

Figure 2:
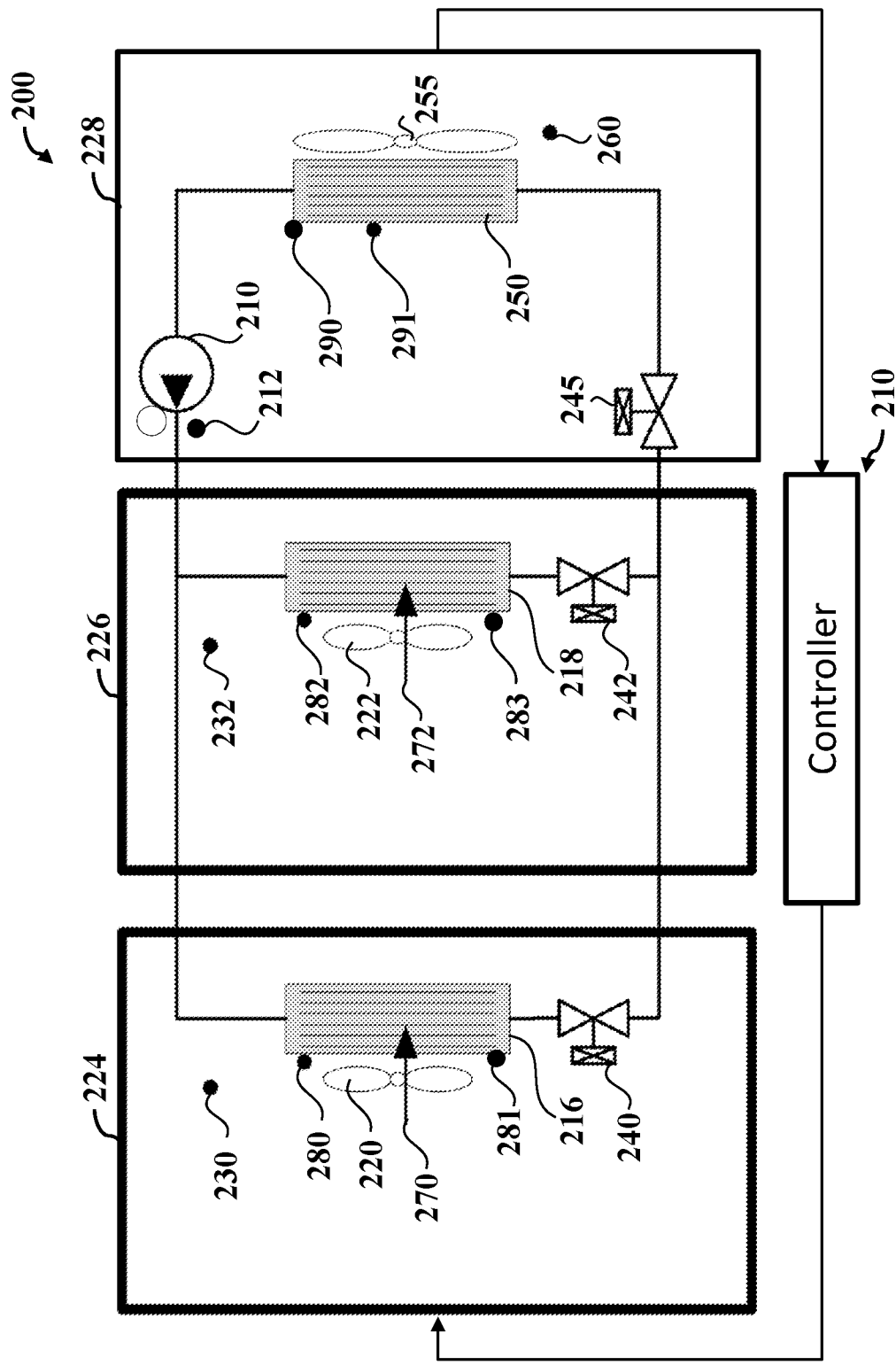
FIG. 2 is a schematic illustrating an arrangement of some principal components of the multi-zone vapor compression system, according to embodiments of the present disclosure.

FIG. 2 is a schematic illustrating an arrangement of some principal components of the multi-zone vapor compression system, according to embodiments of the present disclosure. The multi-zone vapor compression system 200 of FIG. 2 shows only two zones, although the vapor compression system may include any number N of zones. Low pressure refrigerant in the vapor state enters the suction port of the compressor 210. The compressor 210 performs work on the refrigerant to increase the pressure and temperature, and the amount of work is controlled by the compressor rotational frequency CF. A sensor 212 measures the refrigerant discharge temperature $T_D$ exiting the compressor 210. High temperature and pressure refrigerant is then routed to one or more indoor heat exchangers 216, 218 across which one or more fans 220, 222 force air. Heat is removed from the refrigerant and rejected to the air in the zones 224, 226, which are at temperatures measured by zone sensors 230, 122, denoted $T_{Ri}$, 1≤i≤N. As the specific enthalpy of the refrigerant is reduced inside the heat exchangers 216, 218, it condenses and ultimately exits as a high pressure liquid. Temperature sensors 280 and 282 measure the condensing temperature in each indoor heat exchanger 216, 218. Additional temperature sensors 281 and 283 measure the temperature of the subcooled liquid at the exit of each indoor heat exchanger 216, 218. The refrigerant then flows through a set of electronic expansion valves 240, 242 which simultaneously reduce the pressure and temperature in an isenthalpic process. The electronic expansion valve position EEVi, 1≤i≤N controls the size of the valve orifice.

In some embodiments, an additional collective expansion valve 245 with an opening position EEVm is an available degree-of-freedom for regulating overall cycle pressures and cumulative refrigerant flow rate. The low pressure, low temperature refrigerant exiting the valves is a two-phase mixture of liquid and vapor and is passed to the outdoor heat exchanger 250. An outdoor fan 255 forces air across the heat exchanger of the outdoor unit 228. The outdoor fan speed OFS controls the volumetric flow rate of air across the heat exchanger. Sensors 290 and 291 measure the suction temperature $T_S$ and the evaporating temperature $T_E$, respectively. Heat is absorbed by the refrigerant from the ambient air, which is at a temperature $T_A$ measured by an ambient temperature sensor 260. The ambient temperature is considered a measured disturbance. As the specific enthalpy of the refrigerant increases, it evaporates and exits the heat exchanger as a low pressure vapor. The refrigerant is routed to the compressor inlet, completing the cycle. Heat loads $Q_i$, 1≤i≤N, which may be positive or negative, are assumed to be present in the zones and are unmeasured disturbances. If the energy supplied by the local condenser balances the heat load, then the zone temperature does not change, otherwise the zone temperature will increase or decrease when the energy added by the condenser is greater or less than the heat load, respectively. Note that the indoor units are all at a common pressure and condensing temperature, neglecting the pressure drop in the pipes.

Still referring to FIG. 2, an important variable for heat pump control can be the subcooling temperature of each indoor coil, $T_{SCi}$, defined as the difference between the condensing temperature $T_c$, measured at 280 and 282, and the measured temperature of the exiting refrigerant, $T_{outi}$ for 1≤i≤N, measured at 281 and 283. There is an inverse relationship between $T_{SCi}$ and the heat flux from coil i, as a coil with large values of subcooling will produce refrigerant that is cooler at its exit and a reduced heat flux, in comparison to the heat flux produced by a coil with a small value of subcooling. For a zone with a large negative heat load (relative to the other zones), the refrigerant needs to be allowed to subcool a small amount (relative to the other zones), resulting in a relatively large heat flux from the corresponding indoor coil to meet the load. On the other hand, a zone with a relatively small negative heat load needs have a larger amount of subcooling, resulting in a lower heat flux from the indoor coil. This property is used to achieve different zone temperatures and reject asymmetric heat loads.

The vapor compression system 200 can be modeled as a set of linear differential equations with nonlinear output:

$$\dot{x} = Ax + B_p u_p + B_s u_s + B_d d + B_q q \quad (1)$$

$$y_p = C_p x \quad (2)$$

$$y_s = C_s x + D_{sp} u_p + D_{ss} u_s \quad (3)$$

$$p = h(y_s). \quad (4)$$

Here, x is an n-dimensional state vector, $u_p$ is a primary control input vector, $u_s$ is a secondary control input vector, d is a measured outdoor air temperature, $q \in \mathfrak{R}^N$ is a vector of unmeasured heat load disturbances in each zone, $y_p$ is a primary vector of measured zone temperatures and measured process variables, which may include indoor and outdoor unit temperatures and pressures, $y_s$ is a vector of signals that are used to compute the compressor and fan power consumptions, $p \in \mathfrak{R}_+$ is the system power consumption, and h is a nonlinear model of the power consumption that is described in detail below. In equation (1) the · above x is used to denote derivative with respect to time, or $$\frac{d}{dt}.$$

Still referring to FIG. 2, numerical values for A, $B_p$, $B_s$, $B_d$, $B_q$, $C_p$, $C_s$, $D_{sp}$, and $D_{ss}$ in (1)-(3) may be computed directly from data obtained by system identification methods, or values may be computed by linearizing a detailed system model such as a finite volume model, which may be constructed using the Modelica modeling language, for example. Using such a detailed model, a linearized model may be symbolically computed, numerically evaluated at a representative operating condition, and reduced through a sequence of Hankel norm truncations and singular perturbations, giving the n-order model (1)-(3).

Equation (4) is a model of the compressor and outdoor fan power consumption. The outdoor fan and compressor account for all of the modeled power consumption, and (4) may be expressed as a nonlinear function, $$p = h(y_s) = p_c(p_{suc}, p_{dis}, u_{p1}) + p_f(u_{s1}), \quad (5)$$

where $p_{suc}$ is the compressor suction pressure, $p_{dis}$ is the compressor discharge pressure, $u_{p1}$ is the compressor speed CF, also denoted $u_{p1}$ because it is the first element of the primary control input vector in one embodiment, and the fan power $p_f$ is modeled as a cubic polynomial $$p_f(u_{s1}) = \gamma_0 + \gamma_1 \cdot u_{s1} + \gamma_2 \cdot u_{s1}^2 + \gamma_3 \cdot u_{s1}^3, \quad (6)$$

where $u_{s1}$ is the outdoor fan speed OFS, which is the first element of the secondary control input vector in one embodiment. It is important to note that equation (4) defines elements of the secondary output vector $y_s$. In one embodiment, $y_s = [p_{suc}, p_{dis}, CF, OFS]$.

Similarly, the compressor power $p_c$ is modeled as $$p_c(p_{suc}, p_{dis}, u_{p1}) = \quad (7)$$
$$\zeta_1(u_{p1}) + \zeta_2(u_{p1}) \cdot p_{suc} \cdot \eta_V \cdot u_{p1} \cdot V_{disp} \cdot \left(\frac{p_{dis}}{p_{suc}}\right)^{\zeta_3(u_{p1})} +$$
$$\zeta_4(u_{p1}) \cdot p_{suc} \cdot \eta_V \cdot u_{p1} \cdot V_{disp},$$

where the volumetric efficiency is $$\eta_V(p_{suc}, p_{dis}, u_{p1}) = \theta_1(u_{p1}) + \theta_2(u_{p1}) \cdot \left(\frac{p_{dis}}{p_{suc}}\right) + \theta_3(u_{p1}) \cdot \left(\frac{p_{dis}}{p_{suc}}\right)^2 + \qquad (8)$$
$$\theta_4(u_{p1}) \cdot (p_{dis} - p_{suc}) + \theta_5(u_{p1}) \cdot p_{suc} \cdot (p_{dis} - p_{suc}),$$

$V_{disp}$ is the compressor displacement, $\theta_j(s)=\beta_{j0}+\beta_{j1}s$, $\zeta_i(s)=\alpha_{i0}+\alpha_{i1}s+\alpha_{i2}s^2$ for $i=1, \ldots, 4$ and $j=1, \ldots, 5$. The parameters $\gamma_k$, $\alpha_{ik}$ and $\beta_{jk}$ can be tuned empirically from data using different methods. It is understood that the model of power consumption (5) is representative of any more general function h in (4), and more generally (4) it may include other variables that are either input variables, state variables, or mathematical functions of input or state variables which may or may not be directly measured.

Figure 3:
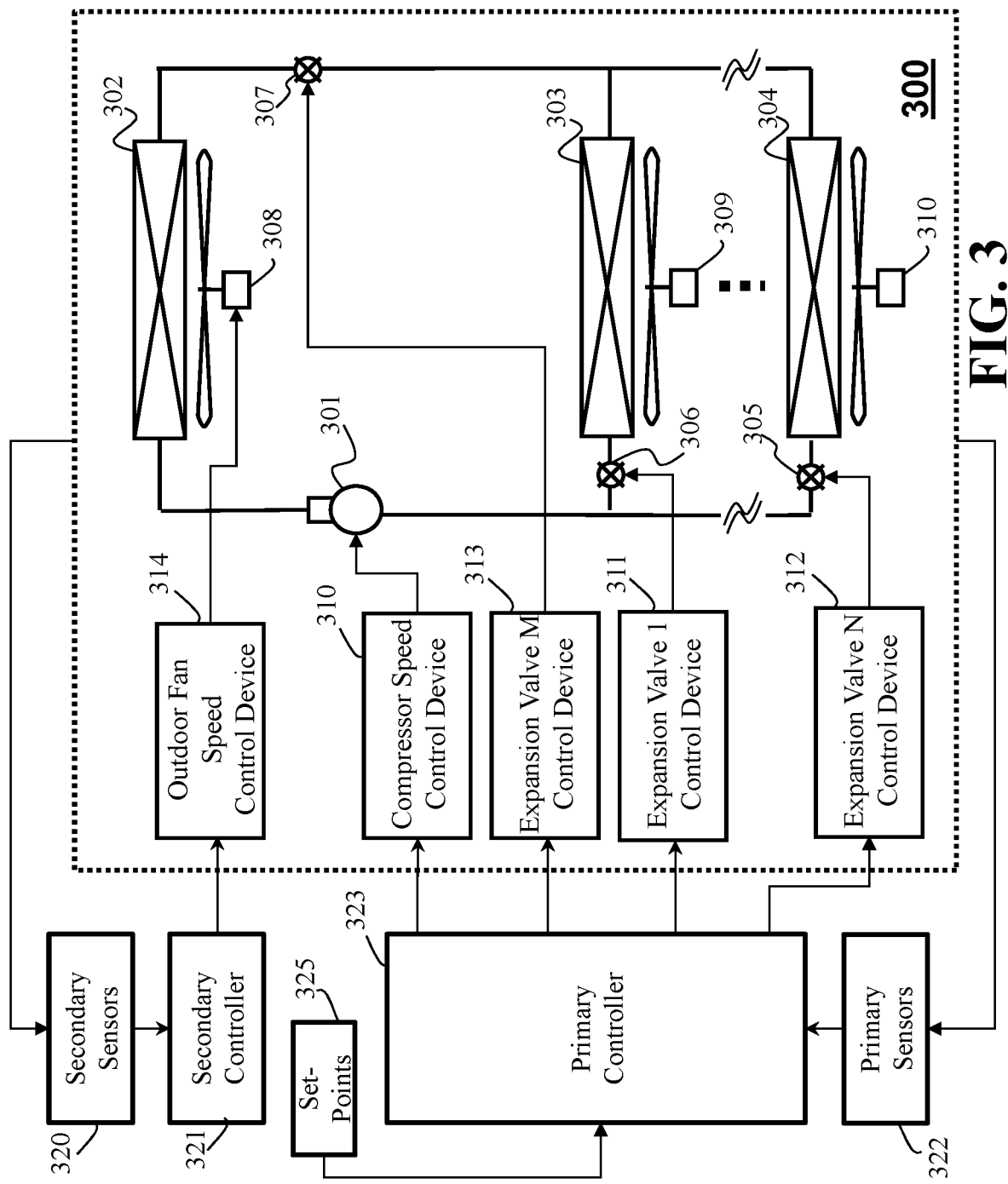
FIG. 3 is a block diagram schematic illustrating the principle components of the controller in which the secondary controller controls the outdoor fan speed, and the secondary inputs are directly measured, according to embodiments of the present disclosure.

FIG. 3 is a block diagram schematic illustrating the principle components of the controller in which the secondary controller controls the outdoor fan speed, and the secondary inputs are directly measured, according to embodiments of the present disclosure. FIG. 3 illustrates the vapor compression system 300 of claim 1 includes a set of primary actuators 310, 311, 312 and 313, and a set of a set of secondary actuators 314. The set of primary actuators are used by the primary controller 323 to regulate key process variables or zone temperatures to set-points. The set of secondary actuators are used by the secondary controller 321 to drive the entire system to its minimum overall power consumption. Further, a set of primary sensors 322 provide a primary set of system outputs to a primary controller, and a set of secondary sensors 320 provide a secondary set of system outputs to the secondary controller.

The primary controller 323 is a compensator and a feedback loop that takes as inputs a set of measured primary system outputs, i.e. receives the primary set of system outputs via the primary sensors 322, and computes or produces a primary set of control inputs for the set of primary actuators 310, 311, 312, 313, to regulate one or more zone temperatures 230, 232 to set-points and to regulate one or more critical process variables to set-points. The primary controller 323 computes the primary set of control inputs using a compensator that may be designed using loop-shaping techniques, for example, and may include integral action in order to drive the zone temperatures and process variables to their set-points for constant values of set-point references and constant values of disturbances. The integral action may include anti-windup in order to enforce constraints on the primary system inputs.

Still referring to FIG. 3, the critical process variables can be a measured or unmeasured variable of the vapor compression system that can be important for proper operation, and may be regulated, such as a sub-cooling temperature in a condenser, or a superheat temperature in an evaporator, or the discharge temperature of the compressor.

The vapor compression system controller 310 includes a secondary controller 321 that includes a compensator and a feedback loop that takes as input or receives the secondary set of system outputs via secondary sensors 320 or via estimates of the secondary inputs 425 (see FIG. 4), and computes or produces a secondary set of control inputs in order to minimize an overall system power consumption in steady-state conditions. The secondary controller 321 computes the secondary set of control inputs that drives the system in the direction of the negative gradient of power consumption. Wherein the secondary controller 321 uses an executable program from the hardware memory to compute a gradient of a power consumption function, a steady-state gain from the secondary control inputs to the secondary system outputs, and a compensator that includes integral action.

Figure 4:
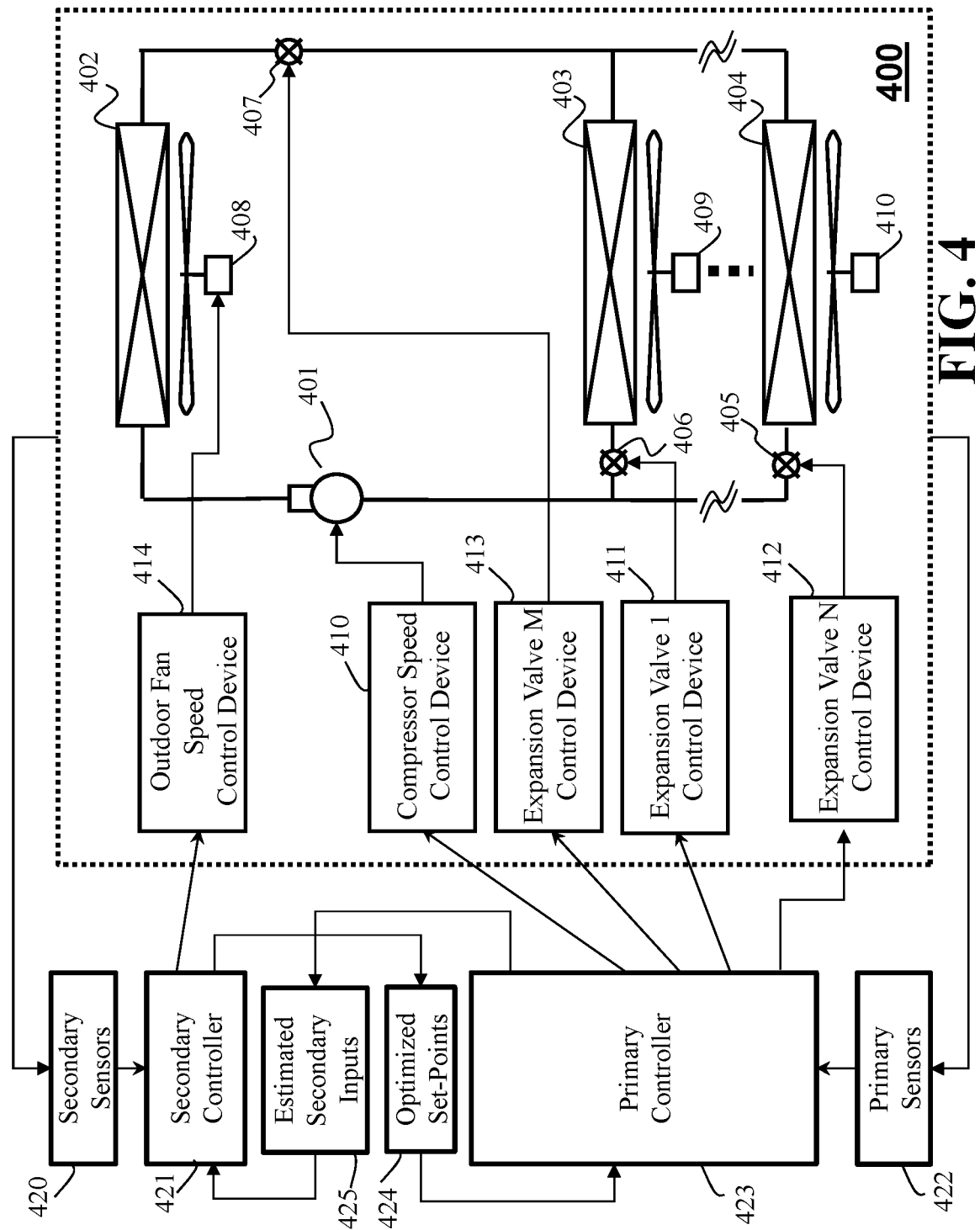
FIG. 4 is a block diagram schematic illustrating the principle components of the controller in which the primary controller produces estimates of the secondary inputs, the secondary controller produces optimized set-points for the primary controller, and the secondary controller controls the outdoor fan speed, according to embodiments of the present disclosure.

FIG. 4 is a block diagram schematic illustrating the principle components of the controller in which the primary controller produces estimates of the secondary inputs, the secondary controller produces optimized set-points for the primary controller, and the secondary controller controls the outdoor fan speed, according to embodiments of the present disclosure. FIG. 4 illustrates the vapor compression system 400 includes primary sensors 422 and secondary sensors 420. The primary controller 423 to regulate key process variables or zone temperatures to set-points. The set of secondary actuators 414 are used by the secondary controller 421 to drive the entire system to its minimum overall power consumption. Further, a set of primary sensors 422 provide a primary set of system outputs to a primary controller 423, and a set of secondary sensors 420 provide a secondary set of system outputs to the secondary controller 421.

The primary controller 423 is a compensator and a feedback loop that takes as inputs a set of measured primary system outputs, i.e. receives the primary set of system outputs via the primary sensors 422. The primary controller 423 computes the secondary set of control inputs using a compensator that may be designed using loop-shaping techniques, for example, and may include integral action in order to drive the zone temperatures and process variables to their set-points for constant values of set-point references and constant values of disturbances. The integral action may include anti-windup in order to enforce constraints on the primary system inputs.

Still referring to FIG. 4, the critical process variables can be a measured or unmeasured variable of the vapor compression system that can be important for proper operation, and may be regulated, such as a sub-cooling temperature in a condenser, or a superheat temperature in an evaporator, or the discharge temperature of the compressor.

The vapor compression system controller 400 includes a secondary controller 421 that includes a compensator and a feedback loop that takes as input or receives the secondary set of system outputs via secondary sensors 420 or via estimates of the secondary inputs 425 (see FIG. 4), and computes or produces a secondary set of control inputs in order to minimize an overall system power consumption in steady-state conditions. The secondary controller 421 computes the secondary set of control inputs that drives the system in the direction of the negative gradient of power consumption. Wherein the secondary controller 421 uses an executable program from the hardware memory to compute a gradient of a power consumption function, a steady-state gain from the secondary control inputs to the secondary system outputs, and a compensator that includes integral action.

Figure 5:
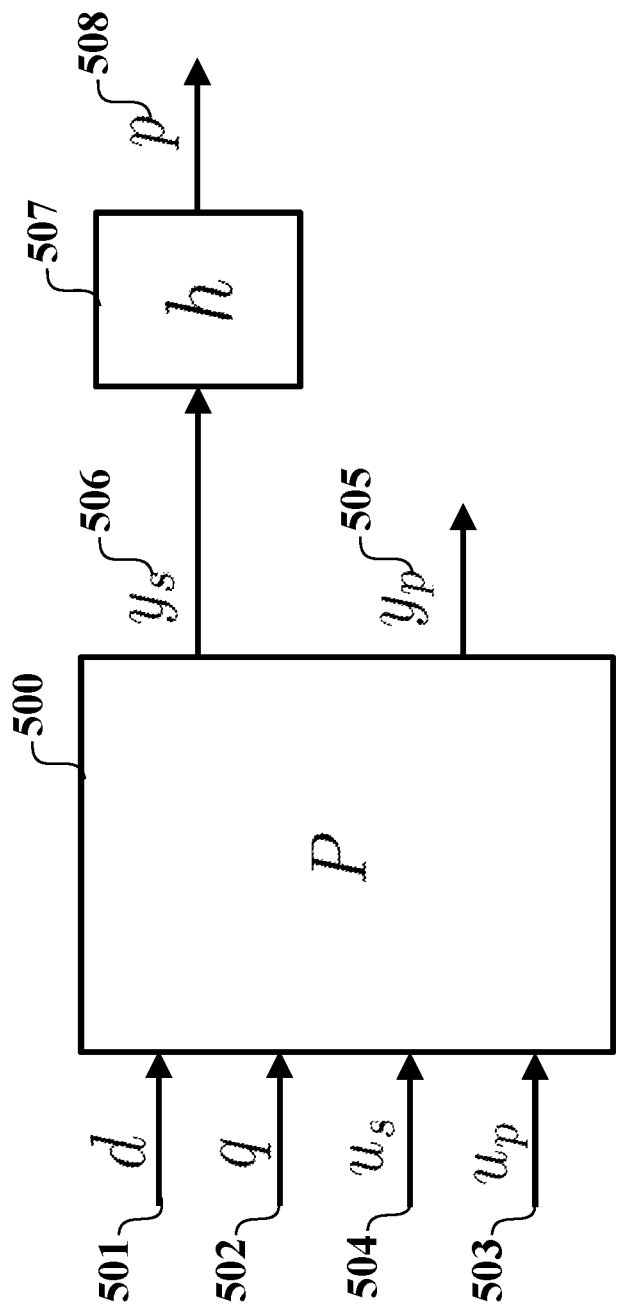
FIG. 5 is a block diagram schematic illustrating the plant representation of the vapor compression system, including a linear part of the system and a power function, according to embodiments of the present disclosure.

FIG. 5 is a schematic illustrating model (1)-(4), according to embodiments of the present disclosure. Wherein, 500 represents the system of equations (1)-(3) and is represented P, 501 is a vector of measured disturbances d, 502 is a vector of unmeasured disturbances q, 503 is a vector of primary control inputs $u_p$, 503 is vector of secondary control inputs $u_s$, 505 is vector of primary outputs $y_p$, 506 is a vector of secondary outputs $y_s$, 507 is the nonlinear power function (4), and 508 is the system power consumption.

In this particular embodiment, the primary control input vector 503, denoted $u_p$, includes a subset of the total available control inputs to the vapor compressor system, chosen to meet the requirements of zone temperature regulation and regulation of critical process variables. In an embodiment, the primary control input vector $u_p$ includes the compressor speed CF, the electronic expansion valves EEVi, $1 \leq i \leq N$, and the electronic expansion valve EEVm. The secondary control input vector 504, denoted $u_s$, includes additional vapor compression system control inputs that may be used to minimize the vapor compression system power consumption, or it may include set-points in the primary controller.

Referring to FIG. 5 and FIG. 3, the secondary input vector $u_s$ 504 in one embodiment is the outdoor fan speed (OFS) 308, which is directly controlled via the Outdoor Fan Speed Control Device 314. The primary output vector 505 includes a subset of the available system measurements that are used in feedback to control the primary control input vector 503. In one embodiment, the primary output vector 505 includes the zone temperature measurements 230, 232, and temperature measurements from the indoor and outdoor heat exchangers and the compressor, 212, 280, 281, 282, 283, 290, 291, and 260 (see FIG. 2). The secondary output vector 506, denoted $y_s$, includes variables that are used in a power function to compute the system power consumption. In one embodiment, 506 is the vector $y_s = [p_{suc}, p_{dis}, CF, OFS]$. However, in other embodiments, 506 may include estimates of variables that are not directly measured, and which may come from the primary controller.

In the particular embodiment, the primary control inputs 503 are used to regulate the zone temperatures and critical process variables, and the secondary control inputs 504 are used to minimize the system power consumption. However, in some embodiments, some of the components of the secondary output vector 506 are not directly measured. In this case, the variables may be estimated by the primary controller 425. This embodiment is illustrated in FIG. 4. Further, in some embodiments, the secondary control inputs may include one or more optimize 6 set-points for the primary controller 424.

Referring to FIG. 3, is a schematic illustrating a generalized plant representation of the vapor compression system, denoted P, according to embodiments of the present disclosure.

Figure 6:
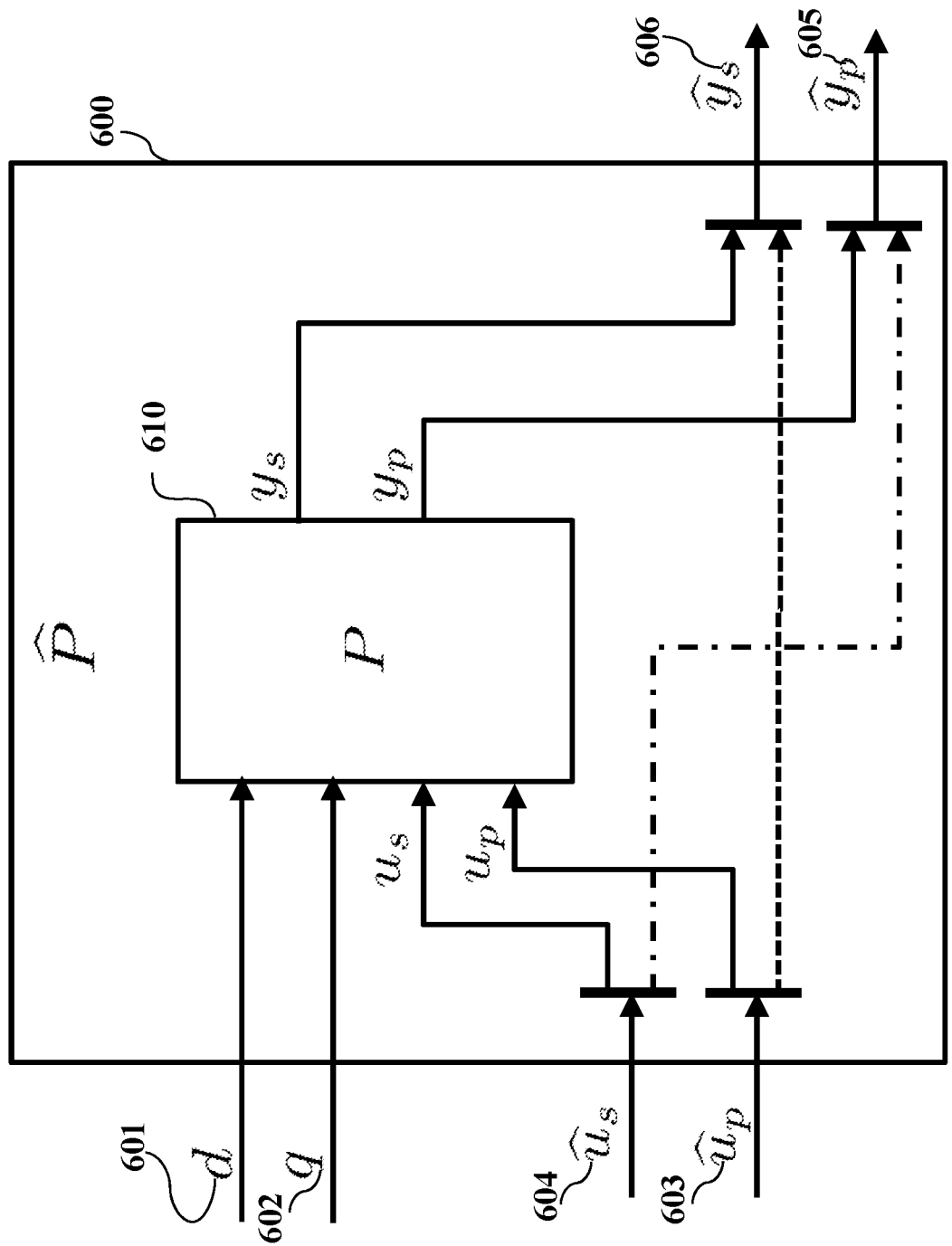
FIG. 6 is a block diagram schematic illustrating the generalized plant representation of the vapor compression system, in which a subset of the primary controller set-points are produced by the secondary controller, and a subset of the secondary controller inputs are estimated by the primary controller, according to embodiments of the present disclosure.

FIG. 6 is a block diagram schematic illustrating the generalized plant representation of the vapor compression system, in which a subset of the primary controller set-points are produced by the secondary controller, and a subset of the secondary controller inputs are estimated by the primary controller, according to embodiments of the present disclosure. In FIG. 6, the generalized primary system 600 output vector 606 is augmented by elements of the generalized secondary control input 604. In addition, the secondary system output vector 606 is augmented by elements of the generalized secondary control input vector 604. The plant model diagrammed in FIG. 5 is embedded as 610. These embodiments in which a subset of components of the secondary output vector are estimated by the primary controller, and subset of components of the primary output vector include optimized set-points produced as output of the secondary controller.

Figure 7:
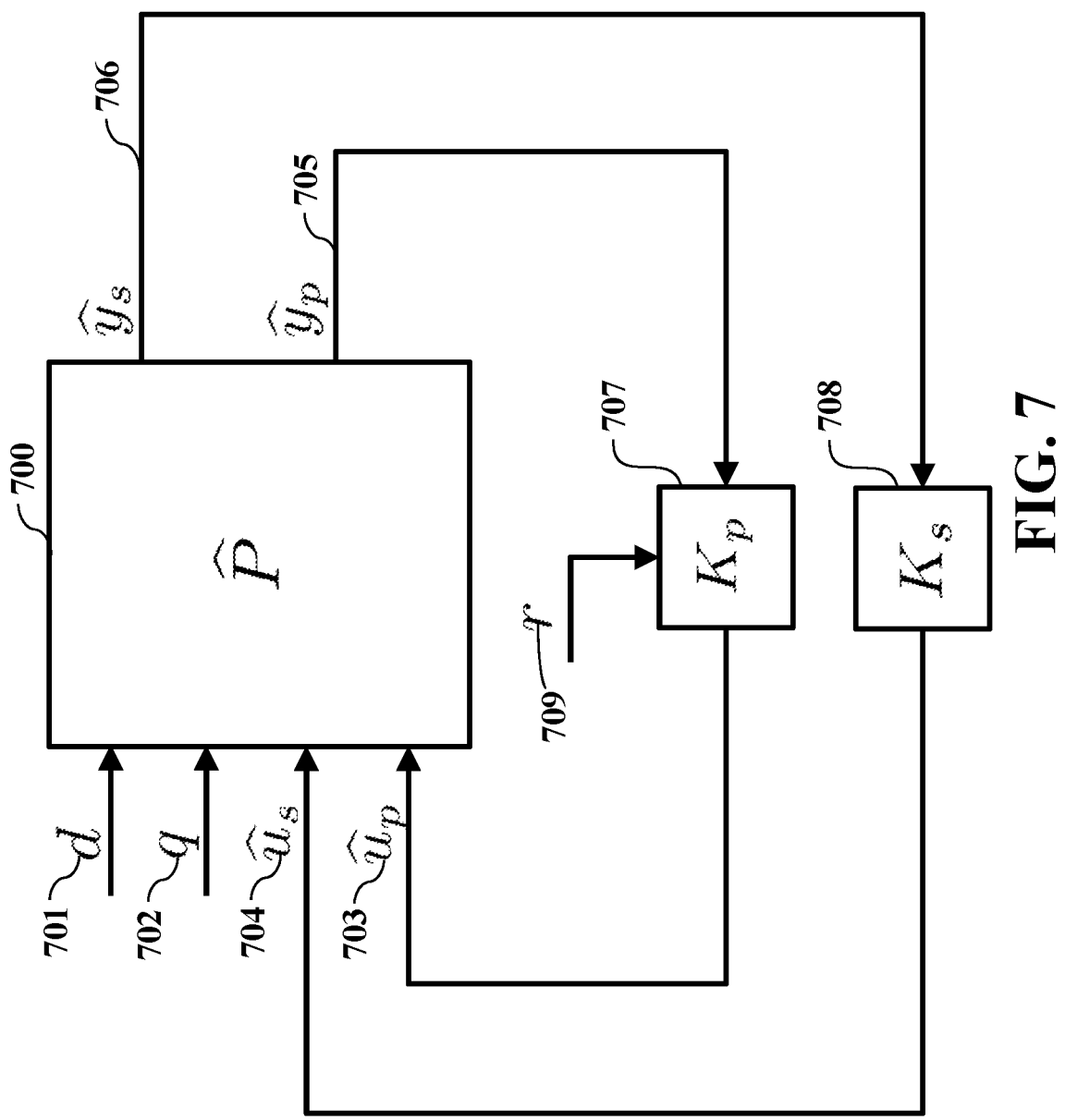
FIG. 7 is a block diagram schematic showing the feedback interconnection of the primary and secondary controllers and the plant, according to embodiments of the present disclosure.

FIG. 7 is a schematic illustrating a vapor compression system subject to the primary and secondary feedback controllers, according to embodiments of the present disclosure. FIG. 7 shows a vapor compression system subject to inputs including 701, a vector of measured disturbances denoted d; 702, a vector of unmeasured disturbance inputs denoted q; 703, a vector of primary control inputs, denoted $\hat{u}_p$; 704, a vector of secondary control inputs, denoted $\hat{u}_s$; and produces outputs including 705, a vector of primary outputs, denoted $\hat{y}_p$; and 706, a vector of secondary outputs, denoted $\hat{y}_s$. The an embodiment includes 707, an inner-loop primary feedback controller denoted $K_p$, which takes as input $\hat{y}_p$, and also 709, a vector of reference set-points, denoted r, and produces as output 703, the vector $\hat{u}_p$, and also 708, an outer-loop secondary feedback controller denoted $K_s$, which takes as input $\hat{y}_s$, and produces as output 704, the vector $\hat{u}_s$.

Still referring to FIG. 7, in one particular embodiment, $\hat{y}_p = y_p$, $\hat{u}_p = u_p$, $\hat{y}_s = y_s$, and $\hat{u}_s = u_s$. Further, in the particular embodiment, $y_s$ includes direct measurements of CF, OFS, $p_{suc}$ and $p_{dis}$. However, in some embodiments, $p_{suc}$ and $p_{dis}$ may not directly measured. In this case, the primary controller $K_p$, 707, is used to compute real-time estimates of $p_{suc}$ and $p_{dis}$, which are denoted $\hat{p}_{suc}$ and $\hat{p}_{dis}$. In these embodiments, the estimates are augmented to the primary control input vector $u_p$ to produce $\hat{u}_p = [u_p, \hat{p}_{suc}, \hat{p}_{dis}]$. The additional estimates are therefore feed back as input to the generalized plant $\hat{P}$. The estimated signals are fed through directly and output in the secondary output which is then denoted $\hat{y}_s = [\hat{p}_{suc}, \hat{p}_{dis}, CF, OFS]$, which used as input to the secondary controller $K_s$. In this manner, in some embodiments, estimates of the suction and discharge pressures may be be used in lieu of actual measurements, as shown in FIG. 4. As such, in some embodiments, the generalized plant $\hat{P}$ includes the model of the plant P augmented with direct feed-through signals.

In one particular embodiment, $u_s = \hat{u}_s = OFS$, as shown in FIG. 3. However, in some embodiments, other control inputs may be available to be used to minimize power consumption. Furthermore, in some embodiments, the OFS may not be a variable under the authority of the control system, or may be a constant fan speed. As such, in some embodiments, $\hat{u}_s$ may include available reference set-points to the primary controller, or alternative control inputs to the plant P. In some embodiments, $\hat{u}_s$ may include a reference set-point for one or more condenser subcooling temperature(s), or one or more evaporator super heat temperature(s), or one or more compressor discharge temperature(s). In some embodiments $\hat{u}_s$, which is the computed output of the outer-loop controller 608, is fed directly through the generalized plant 600 and augmented into the primary output 605, such that $\hat{y}_p = [y_p, \hat{u}_s]$, in order to be an available reference set-point for the primary controller 707. As such, in some embodiments, the generalized plant $\hat{P}$ includes the model of the plant P augmented with direct feed-through signals, as shown in FIG. 6.

Still referring to FIG. 7, in this particular embodiment a cascade of a primary inner-loop whose primary controller 707 is designed to regulate zone temperatures and critical process variables, and a secondary outer-loop feedback controller 708 is designed to drive the power consumption to its minimum. In this particular embodiment, the primary controller 408 may be designed using $H_\infty$ loop-shaping methods, to regulate the N+2 variables $T_{Ri}$, $1 \leq i \leq N$, $T_{SCmin}$, and $T_D$, which is a subset of $\hat{y}_p$, using the N+2 controls CF, EEV i, $1 \leq i \leq N$, and EEVm that are available in $\hat{u}_p$.

In some embodiments, the primary controller 707 may be a set of decoupled proportional-integral (PI) or proportional-integral-differential (PID) controllers that are tuned so that the closed-loop system is stable and the N+2 variables under control are driven to set-points with zero steady state error for constant values of references and disturbances. In some embodiments, 707 may compute real-time estimates of variables that are not directly measured, such as $p_{suc}$ and $p_{dis}$, and these may be augmented into $\hat{u}_p$. The outer-loop, containing the secondary compensator 708, actuates the the secondary control inputs $\hat{u}_s$ in a manner that minimizes the power consumption for constant values of disturbances and references over the vapor compression system operating envelope.

Primary Controller

This particular embodiment of the present disclosure includes an inner-loop primary controller 707, denoted $K_p$, as shown in FIG. 7.

Figure 8:
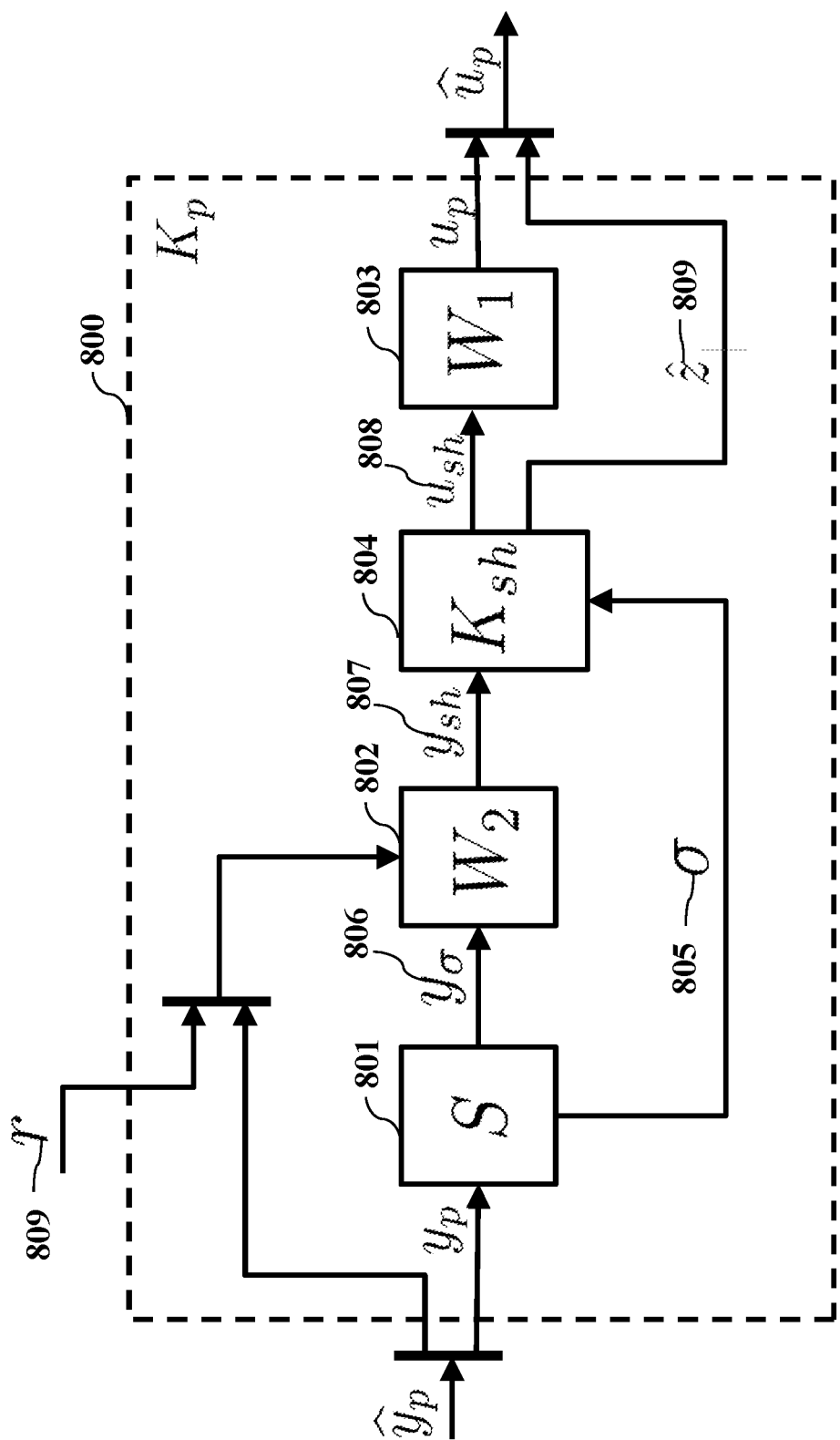
FIG. 8 is a block diagram schematic illustrating some details of the primary compensator, according to embodiments of the present disclosure.

FIG. 8 is a schematic block diagrams illustrating details of this particular embodiment of the inner-loop primary controller, according to embodiments of the present disclosure. The selector 801, denoted S, takes the 3N+4 measurements $y_p$ that are a subset of $\hat{y}_p$ as input and chooses the zone with the minimum subcooling, producing a 2N+4-dimensional output vector 806, denoted $y_o$. Block 802, denoted $W_2$, and 803, denoted $W_1$, are weighting functions that are designed by loop-shaping the plant frequency response computed from the model (1)-(2), in order to meet a set of performance requirements that include regulating zone temperatures to reject unmeasured, constant disturbances with zero steady-state error, regulating the compressor discharge temperature to a constant that depends on operating condition with zero-steady-state error, and regulating the minimum subcooling temperature to a constant set-point with zero steady-state error. In some embodiments, includes proportional-integral type weights and integral action that may be implemented using anti-windup logic to enforce constraints on the primary actuators. Block 804, denoted $K_{sh}$, is a gain-scheduled, robustifying compensator computed by $H_\infty$ loop-shaping synthesis. Importantly, it has an observer-based structure that may be exploited to produce estimates of unmeasured variables, 809.

At least one purpose of the selector 801, denoted S, is to automatically select the zone with the smallest subcooling for feedback. Define the minimum subcooling as $$\bar{T}_{SC} = \min_{1 \le i \le N}(T_C - T_{outi}), \quad (9)$$

where $T_C$ is assumed to be measured by sensors 280 and 282, and define the selector vector $\bar{\sigma} \Re^N$ with elements $$\bar{\sigma}_i = \tanh(\bar{T}_{SC} - (T_C - T_{outi})) + 1, \quad (10)$$

for 1 i which we normalize, $$\sigma = \bar{\sigma}/\Sigma_{i=1}^N \bar{\sigma}_i. \quad (11)$$

Still referring to FIG. 8, the selector vector σ is a normalized weight that "points" in the direction of the zones with the least amount of subcooling, meaning $\sigma_i$ is closer to 1 for the least subcooled zones, while those zones with more subcooling will have $\sigma_i$ closer to zero. It is normalized so that $\Sigma_{i=1}^N \sigma_i = 1$, $0 < \sigma_i < 1$, and is $C_\infty$ to provide a smooth transition among gains for the gain scheduled compensator $K_{sh}$.

In this particular embodiment, the output of the selector $y_o$, 806, is the 2N+4-dimensional vector $y_o$ with elements, for $1 \le i \le N$, $$y_{\sigma i} = y_i = T_{Ri} \quad (12)$$

$$y_{\sigma i+N} = y_{2i+N} = T_{outi} \quad (13)$$

$$y_{\sigma 2N+1} = y_{3N+1} = T_S \quad (14)$$

$$y_{\sigma 2N+2} = y_{3N+2} = T_E \quad (15)$$

$$y_{\sigma 2N+3} = y_{3N+3} = T_D \quad (16)$$

$$y_{\sigma 2N+4} = \sum_{i=1}^N \sigma_i(y_{2i+N} - y_{i+N}) =: T_{SCmin}. \quad (17)$$

Still referring to FIG. 8, the N+2 variables to be regulated with the N+2 controls available in $u_p$ are $Y_{\sigma i} = T_{Ri}$, $1 \le i \le N$, $y_{\sigma 2N+3} = T_D$ and $y_{\sigma 2N+} = T_{SCmin}$. To meet the steady-state tracking and disturbance rejection requirements, proportional-integral type weights are augmented to the N+2 controlled output variables, including integral action, as 802, weight $W_2$. The other measurements $T_{outi}$, $1 \le i \le N$, $T_S$ and $T_E$ are weighted in $W_2$ so that their gains are less than unity, with no integral action and with some roll-off for robustness. Thus the elements of $W_2$, labeled for clarity, are $$T_{Ri}: y_{si} = k_1 \frac{1 + s/\omega_1}{s}(y_{\sigma i} - r_i) \quad (18)$$

$$T_D: y_{s2N+3} = k_2 \frac{1 + s/\omega_2}{s}(y_{\sigma 2N+3} - r_d) \quad (19)$$

$$T_{SCmin}: y_{s2N+4} = k_3 \frac{1 + s/\omega_3}{s}(y_{\sigma 2N+4} - r_{sc}) \quad (20)$$

$$T_{outi}, T_S, T_E: y_{sj} = k_4 \frac{1}{1 + s/\omega_4} y_j \quad (21)$$

for $1 \le i \le N$ and $N+1 \le j \le 2N+2$. Note that a positive feedback convention is used. The gains $k_i$, $1 \le i \le 3$ are tuned so that the shaped plant crossover frequency satisfies transient response requirements. Zeros $\omega_i$, $1 \le i \le 3$ are placed to maximize phase margin near crossover, following loop-shaping techniques, and the pole $\psi_4$ is placed so its time constant is about 2-10 minutes, in this particular embodiment. The input weight is $W_1 = I$ in this particular embodiment, but may assume other values, such as weights adjust the contributions of each actuator, in some embodiments.

In other embodiments, the weight may include proportional-integral type weights, which may incorporate anti-windup logic to enforce constraints associated with the primary actuators, and the weight is designed such that it passes through the room temperature measurements and critical process variable measurements, possibly weighted by constants or low-pass filters. Other primary measurements can be passed through using high-pass filters to block the steady-state, thereby forcing the closed-loop system to track the reference set-points with zero steady state error for constant values of set-points and disturbances. The specific values for the weights are computed using loop-shaping techniques.

The reference value for $T_D$ ($r_d$) is scheduled to a value that optimizes system energy efficiency and also ensures positive superheating in the evaporator coil as functions of system load and the outdoor air temperature (d). However, since the load is not measured, the compressor frequency CF may be used as a proxy. Thus in this particular embodiment, a schedule for the $T_D$ reference is $$r_d = k_5 \frac{1}{1 + s/w_5} CF + k_d d, \quad (22)$$

where the first-order filter is included to improve system robustness, and the gains $k_5$ and $k_d$ are tuned to minimize power consumption as a function of outdoor air temperature and compressor frequency. In some embodiments, (22) may be a linear or nonlinear function of these variables and other measured variables. This filter is integrated into the plant model P, along with the weights $W_1$ and $W_2$, to define the shaped plant $P_{sh}$ with input 808, denoted $u_{sh}$, and output 807, denoted $y_{sh}$, for purposes of designing the compensator $K_{sh}$.

Still referring to FIG. 8, $H_\infty$ loop-shaping controller synthesis computes the controller $K_{sh}$ that minimizes $$\gamma = \left\| \begin{bmatrix} K_{sh} \\ I \end{bmatrix} (I - P_{sh}K_{sh})^{-1} \begin{bmatrix} I & P_{sh} \end{bmatrix} \right\|_\infty \tag{23}$$

and robustly stabilizes the family of perturbed plants $$\tilde{P}_{sh} = \{(M_{sh}+\Delta_M)^{-1}(N_{sh}+\Delta_N) : P\Delta_N\Delta_M P_\infty < 1/\gamma\}, \tag{24}$$

where $\Delta_M$ and $\Delta_N$ represent plant uncertainty and the nominal shaped plant is decomposed into normalized left coprime factors $P_{sh}=M_{sh}^{-1}N_{sh}$. This methodology allows a general formulation of a robust stabilization problem and definition of a multivariable robustness margin ($1/\gamma$) without having to explicitly model the uncertainty, which is difficult for vapor compression systems. The shaped plant $P_{sh}$ is written $$\dot{x}_s = A_s(\sigma)x_s + B_s u_{sh} + B_{s0}u_s + B_{sr}r + B_{sd}d + B_{sg}q \tag{25}$$

$$y_{sh} = C_s x_s + D_s r \tag{26}$$

$$z = E_s x_s + F_s u_s + F_0 u_0 + F_d d, \tag{27}$$

where $x_s$ includes the states of the plant P, weights $W_1$ and $W_2$, and $T_D$ schedule, and $A_s$, $B_s$, $B_{s0}$, $B_{sd}$, $B_{sq}$, $C_s$, $E_s$, and $F_s$ are the corresponding matrices in (1)-(2) augmented with (18)-(21) and (22). The equation (27) is used to represent any variables z that may require estimation, such as $p_{suc}$ or $p_{dis}$. In some embodiments, this output vector is augmented onto the shaped plant in order to estimate these variables. Note that $A_s$ depends on the selector vector $\sigma$, but the other matrices are constant.

Still referring to FIG. 8, the controller $K_{sh}$ has the observer-based structure $$\dot{\hat{x}}_s = A_s(\sigma)\hat{x}_s + B_s u_{sh} + B_{s0}u_s + B_{sr}r + B_{sd}d + H_s(\sigma)(\hat{y}_{sh} - y_{sh}) \tag{28}$$

$$\hat{y}_{sh} = C_s \hat{x}_s + D_s r \tag{29}$$

$$u_{sh} = G_s(\sigma)\hat{x}_s, \tag{30}$$

where the control gain $G_s$ and observer gain $H_s$ are both functions of the selector vector $\sigma$. Note that the references and measured disturbances are fed forward. The gains $G_s$ and $H_s$ are computed at particular values of $\sigma$ by computing solutions to two decoupled Riccati equations (6, 8), and then interpolating. In this particular embodiment, N solutions are computed, $$G_s(\sigma) = \Sigma_{i=1}^N \sigma_i G_{si}, \tag{31}$$

$$H_s(\sigma) = \Sigma_{i=1}^N \sigma_i H_{si}. \tag{32}$$

Because (28)-(30) has an observer-based structure, it may be used to compute estimates of z using (27) that are used in the power-minimizing control $K_s$. Subtracting (27) from (28) and defining $\tilde{x}_s = x_s - \hat{x}_s$, the state estimate error is governed by $$\dot{\tilde{x}}_s = (A_s + H_s C_s)\tilde{x}_s + B_{sq}q, \tag{33}$$

which shows that the observer states will not converge to the plant states for nonzero values of q and will consequently bias estimates of z. However, the steady-state value of q (assuming it is constant) may be estimated by inverting (33), i.e. $\hat{y}_{sh} - y_{sh}$, $$\hat{q} = H_q(\hat{y}_{sh} - y_{sh}) \tag{34}$$

where $$H_q = (C_s(A_s + H_s C_s)^{-1} B_{sq})^\dagger, \tag{35}$$

and the symbol †denotes the pseudoinverse. This inverse exists because q is observable from $y_{sh}$, and the dimension of $y_{sh}$ exceeds the dimension of q. This estimate can then be used to remove steady-state bias due to q from the estimate of z, giving $$\hat{z} = E_s x_s + F_s u_s + F_0 u_0 + F_d d + H_z q \tag{36}$$

where $$H_z = -C_s(A_s + H_s C_s)^{-1} B_{sq}. \tag{37}$$

Note that $H_q$ and $H_z$ are functions of $\sigma$, and are gain scheduled as in (32).

Still referring to FIG. 8, in some embodiments, an estimate of discharge pressure $\hat{p}_{dis} = \hat{z}_1$ may be used to generate an estimate of the condensing temperature via the refrigerant saturation curve, which is well-approximated with a third order polynomial $f_s$ over the operating envelope, i.e., $$\hat{T}_C = f_s(\hat{p}_{dis}) \tag{38}$$

providing a means to estimate $T_c$ if the upstream temperature sensors in all of the indoor units are not effective. In some embodiments, a minimum selector on the measurements and estimates may be used to estimate $T_c$. In some embodiments, the zone loads q are estimated, which may be useful for zone virtual metering.

Figure 9:
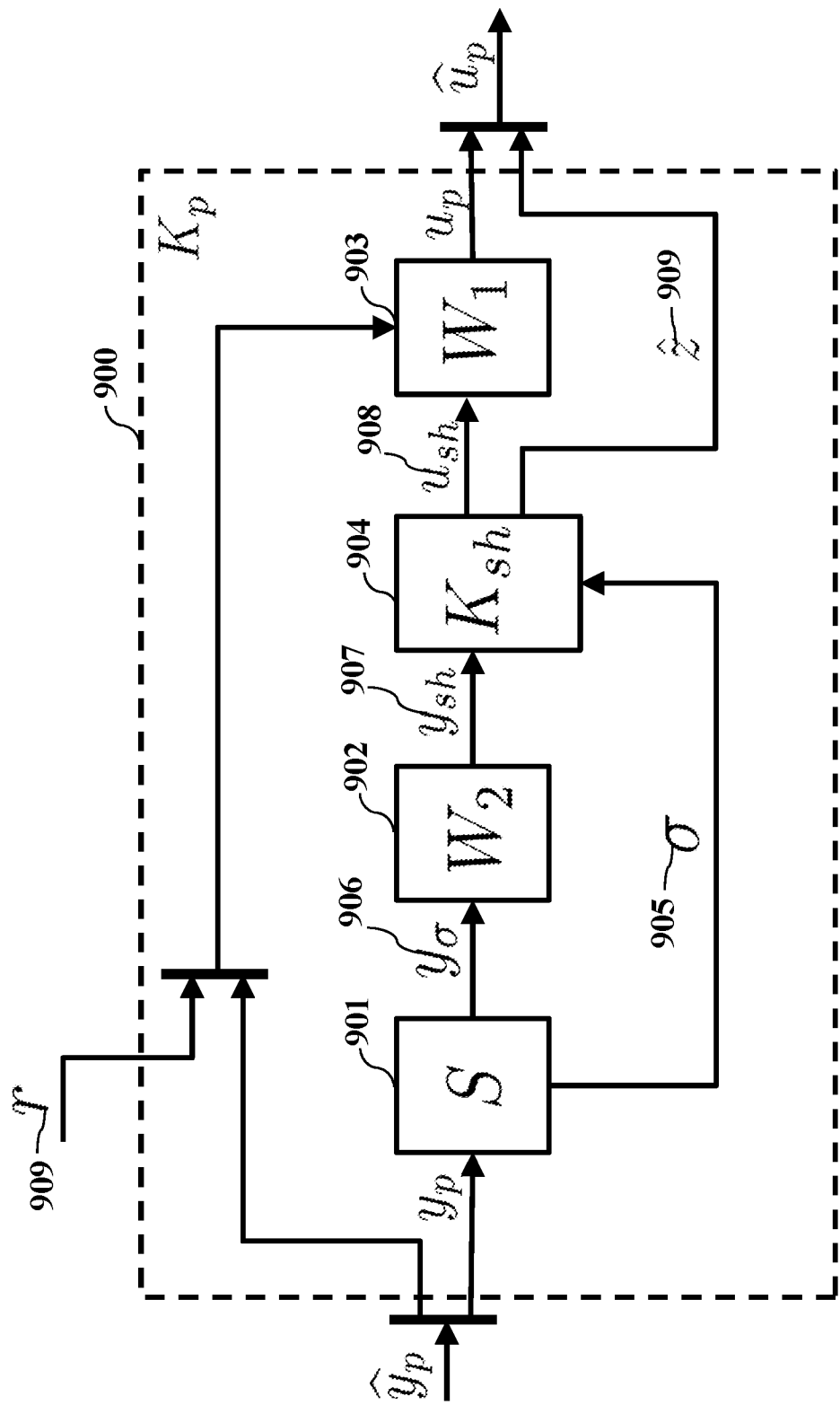
FIG. 9 is a block diagram schematic illustrating some further details of the primary compensator, according to embodiments of the present disclosure.

In this particular embodiment, the references 809 enter into the weight 801, denoted $W_2$. In some embodiments, the references may enter into weight $W_1$, as shown in FIG. 9, in which case $W_1$ 903 may be designed to include integral action following one or more loop-shaping methods, in order to enforce constraints on the allowable range of the primary inputs such as limits on the compressor speed, valve positions or fan speeds. In some embodiments, integral action may be incorporated into weights 903, or 902, or 802 or 803, and some number of integrators may incorporate anti-windup to accommodate actuator saturation.

Secondary Controller

With the inner-loop primary feedback (28)-(30) closed, consider the partially closed-loop system with input $\hat{u}_s$ and output p. For constant values of $r_i$, $1 \le i \le N$, d and q, we assume that the steady-state function from $\hat{u}_s$ to p is strictly convex for some interval $u_{smin} \le \hat{u}_s \le u_{smax}$. This property is exploited in model-free extremum-seeking prior art.

Figure 10:
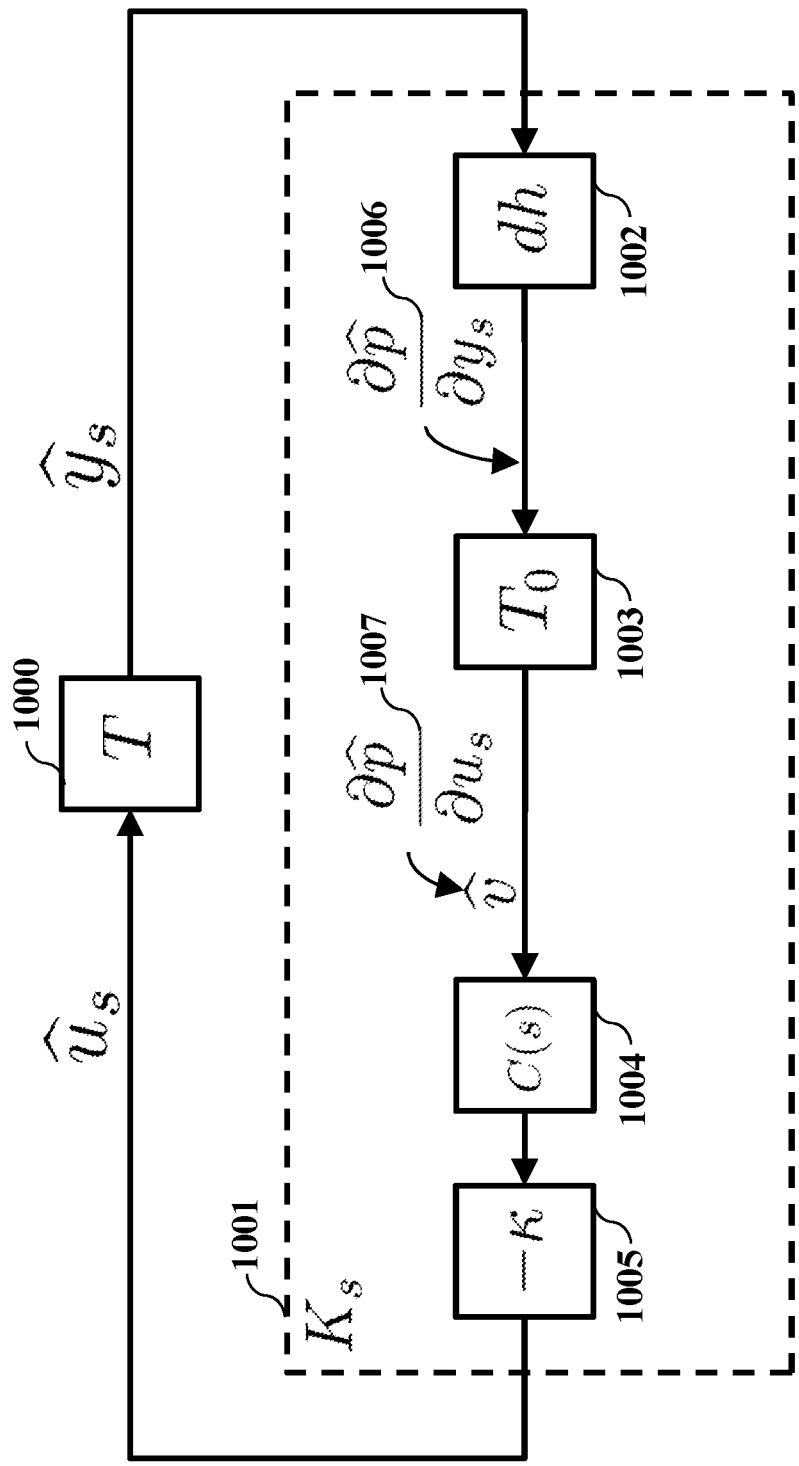
FIG. 10 is a block diagram schematic illustrating the feedback operation of the secondary controller, according to embodiments of the present disclosure.

In this aspect of the present disclosure, a secondary feedback control loop is used to achieve exponential convergence of power to its minimum value. Denote the partially closed-loop transfer function (with the primary feedback loop closed) from $\hat{u}_s$ to $\hat{y}_s$ be denoted by $T(s)$. Referring to FIG. 10, define the steady-state gain as $T_0 = T(0)$, 1003. In this particular embodiment, the secondary compensator 708, denoted $K_s$, is $$u_0(t) = -?\int_0^t dh(\hat{w}(\tau)) \cdot T_0 d\tau \tag{39}$$

with κ>0, where the gradient $$dh = \frac{\partial h(y_s)}{\partial y_s}$$

is computed analytically from (5)-(8).

FIG. 10 is a schematic illustrating the secondary compensator, according to embodiments of the present disclosure. In an embodiment, $\hat{y}_s = y_z = [p_{suc}, p_{dis}, CF, OFS]$. However, in other embodiments, $\hat{y}_s = [\hat{p}_{suc}, \hat{p}_{dis}, CF, OFS]$, so that some subset of the elements of $\hat{y}_s$ are estimated by the primary compensator, and may not be directly measured. In an embodiment, $\hat{y}_s$ has 4 elements, and $T_0$ 1003 has 4 elements. However, in other embodiments, $\hat{y}_s$ and $T_0$ may have any number of elements. In an embodiment, compensator 1004 C(s) is an integrator, $$C(s) = \frac{1}{s}.$$

In other embodiments, C(s) may be any compensator that renders the closed-loop in FIG. 10 stable, and includes integral action, such as a PI or PID type compensator, for example. Wherein the integral action can be understood as action by a controller or control mechanism that makes changes to the inputs based on the accumulated error over a period of time, such that the error is driven to zero.

The closed-loop system (1)-(4) with primary feedback (28)-(30) and secondary feedback (39) is locally exponentially stable for $0<\kappa<\bar{\kappa}$ for some (sufficiently small) $\bar{\kappa}>0$, with C(s)=1/s (an integrator) if:
1) references $r_i$, $1\le i\le N$, and disturbances d and q are sufficiently slowly-varying, and
2)

$$\frac{\partial^2 h}{\partial u_0^2}(T_0 u_0) > 0.$$

In this case solutions converge exponentially to the minimum value of power (5) for constant values of $r_i$, $1\le i\le N$, d and q. This is an advantage over other prior art because the system converges to its minimum power faster.

Still referring to FIG. 10, the proof of this statement is as follows. The inner-loop is exponentially stable by design at fixed σ. Assumption (1) ensures that the gain-scheduled primary controller is exponentially stable for time-varying σ. We can show that the feedback (39) is locally exponentially stabilizing. The system from input $\hat{u}_s$ to output 1007, denoted $\bar{v}$, written in state space form is $$\dot{\xi} = A_o \xi + B_o \bar{u}_s \quad (40)$$

$$\hat{v} = dh(C_o \xi) \cdot T_0 \quad (41)$$

where $(A_o, B_o, C_o)$ is a realization of T. Without loss of generality, shift the origin of (40)-(41) to the minimum of h (so that $\hat{u}_s = 0$ and $\xi = 0$ correspond to the minimum value of p). Assumption (2) implies $dh(-C_o A_o^{-1} B_o \hat{u}_s) \cdot T_0$, the gradient of $\hat{p}$ with respect to $\hat{u}_s$ in the steady-state, is an odd function that vanishes at $\hat{u}_s = 0$, and that dh has a linear term in its Taylor's series at this point. The secondary control (39) is integral type feedback around (40)-(41), $$\hat{u}_s = -\kappa \int_0^t \hat{v}(\tau) d\tau \quad (42)$$

The closed-loop is locally exponentially stable for sufficiently small gain κ by a root-locus argument with (41) linearized at the origin, provided the sign of the feedback is negative, which is ensured by $T_0$. This is because all of the poles of T are in the open left-half plane, and the integral feedback (42) adds a pole at the origin, which will move into the open left-half plane, while the other poles remain in the open left-half plane, for sufficiently small κ. Because $\xi$ converges to 0 exponentially, the power converges to its minimum exponentially. It is clear that this argument may be applied for other structures of C(s) such as a PI type compensator.

Still referring to FIG. 10, in effect the secondary feedback control (39) drives $\hat{u}_s$ to a condition in which dh is orthogonal to $T_0$, at which point the power is at a local minimum.

In some embodiments, estimated variables are used in $\hat{y}_s$, so that the gradient of the estimated power is used in the secondary feedback. In some embodiments, the gain κ needs to be limited because because in some embodiments T is not non-minimum phase, so sufficiently high gain may result in instability.

Figure 11:
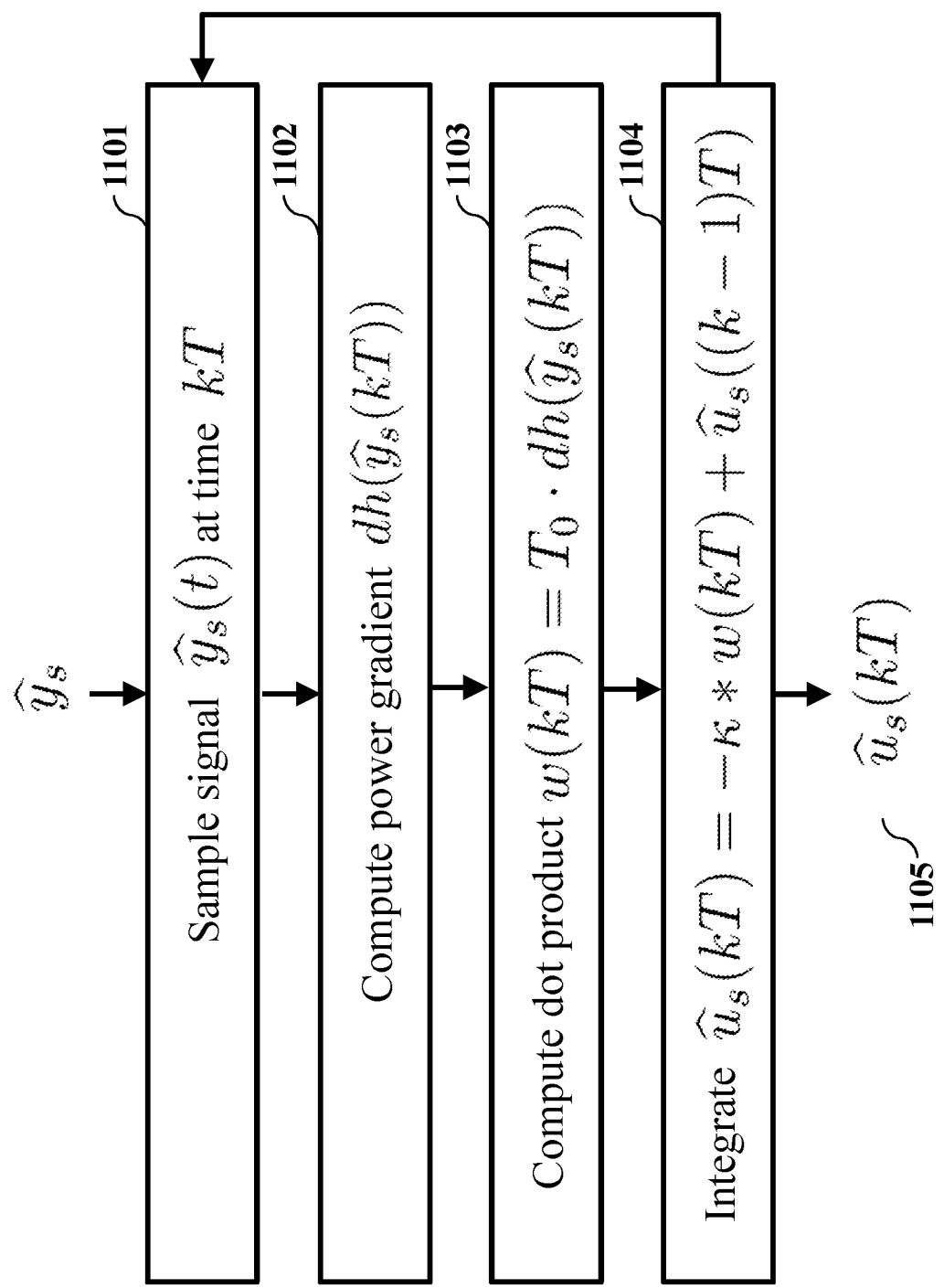
FIG. 11 is a flow chart illustrating the operation of the secondary controller, according to embodiments of the present disclosure.

FIG. 11 is a flow chart showing one embodiment of the secondary controller wherein the compensator is integral action, according to embodiments of the present disclosure. The secondary outputs $\hat{y}_s$ are sampled at time kT, 1101. Then the gradient of the power consumption function dh is computed and evaluated at $\hat{y}_s$, 1102, and then the dot product between dh and $T_0$ is computed, 1103, and that signal is passed to the compensator C(s), 1104, in this case a simple integrator, and the result is multiplied by a small negative gain and applied to the secondary input, 1105.

Features

According to aspects of the present disclosure, some of the secondary set of system outputs are obtained from a set of secondary estimates from a primary controller or from the set of secondary sensors. Other aspects include that some of the set-points of the primary controller are obtained as outputs of the secondary controller. Further, some aspects include the set-points of the primary controller are predetermined set-points that are set by a user, an environmental management system or an environmental controller. It is possible that an aspect can include the primary controller is a H-infinity loop-shaping controller, such that the H-infinity loop-shaping controller is gain scheduled.

According to some other aspects of the present disclosure, some secondary sensors includes one or a combination of compression suction pressure, compressor discharge pressure, compressor speed or outdoor fan speed. Further, other aspects can include that some primary sensors include one or a combination of zone temperature measurements, heat exchanger temperature measurements or compressor temperature measurements. Further still, some aspects include that some secondary actuators include one or a combination of outdoor fan speed, condenser sub-cooling temperature set point, evaporator super heat temperature set point or compressor temperature set point. It is possible that some aspects are that some primary actuators include one or a combination of compressor speed or electronically actuated valve command. Further, other aspects may be that the secondary controller produces the secondary set of control inputs based on an an inner product between a gradient of a power consumption function and a steady-state gain from the secondary control inputs to the secondary system outputs, integrated over time and multiplied by a feedback gain. Other aspects include that the executable program executed by the secondary controller uses the secondary set of system outputs to compute a gradient of a power consumption function, a steady-state gain from the secondary control inputs to the secondary system outputs, and an integral action. Such that the integral action includes one or a combination of a dead zone, anti-windup or saturation.

Figure 12:
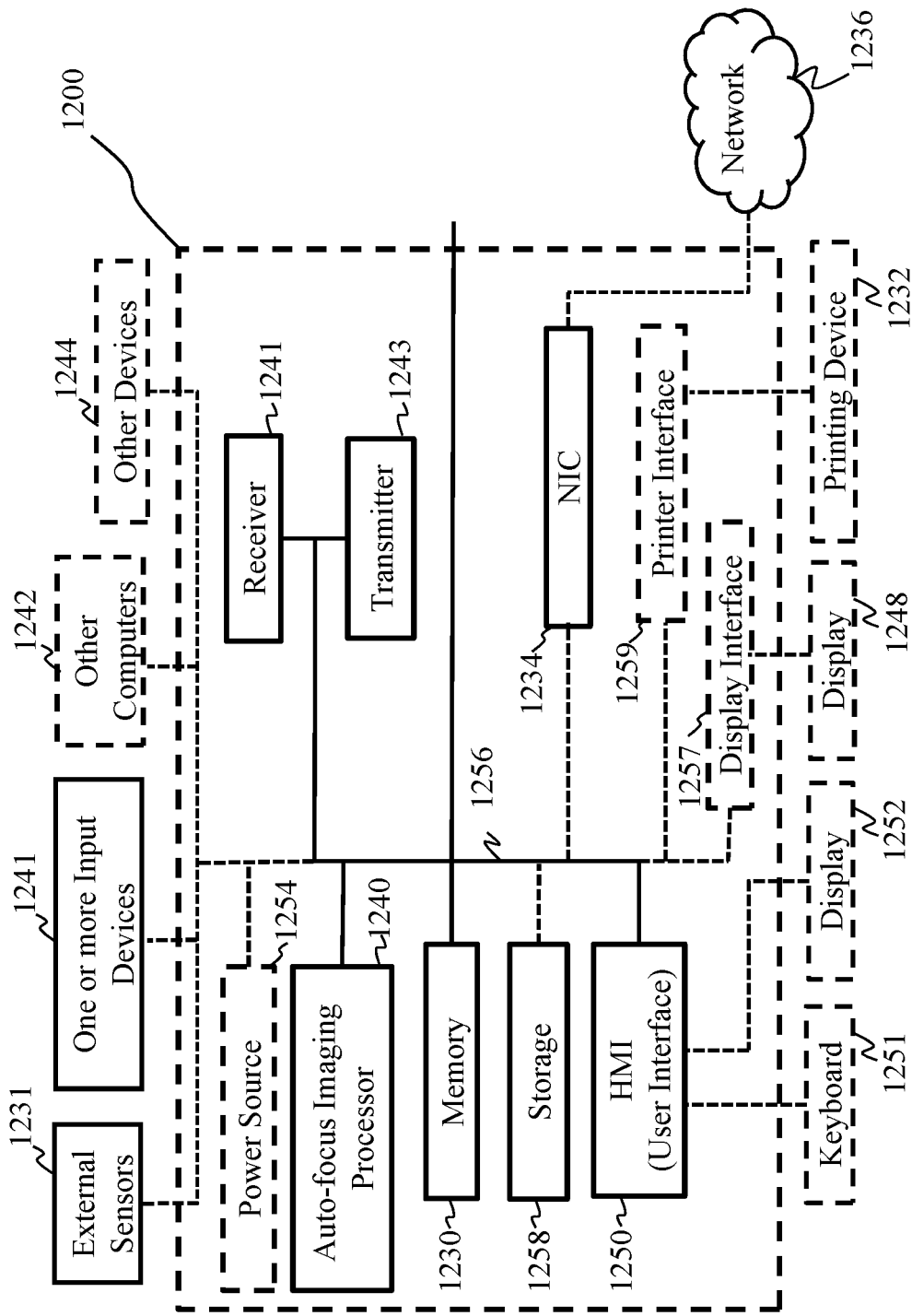
FIG. 12 is a block diagram of an alternate controller of the vapor compression system contemplated by the present disclosure, in accordance with some embodiments of the present disclosure.

FIG. 12 is a block diagram of an alternate controller of the vapor compression system contemplated by the present disclosure, in accordance with some embodiments of the present disclosure. The alternate controller 1200 can store the collected data in the memory 1230 that is processed. The alternate controller 1200 includes a human machine interface or user interface 1250 that can connect the alternate controller to a keyboard 1251 and display device 1252. The alternate controller 1200 can be linked through the bus 1256 to a display interface 1257 adapted to connect the system 1200 to a display device 1248, wherein the display device 1248 can include a computer monitor, camera, television, projector, or mobile device, among others.

The alternate controller 1200 can include a power source 1254, depending upon the application the power source may be optionally located outside of the alternate controller. The processor 1240 maybe one or more processors that can be configured to execute stored instructions, as well as be in communication with the memory 1230 that stores instructions that are executable by the processor 1240. The processor 1240 can be a single core processor, a multi-core processor, a computing cluster, or any number of other configurations. The processor 1240 is connected through a bus 1256 to one or more input and output devices. The memory 1230 can include random access memory (RAM), read only memory (ROM), flash memory, or any other suitable memory systems.

Still referring to FIG. 12, the alternate controller 1200 can also include a storage device 1258 adapted to store supplementary data and/or software modules used by the processor 1240. For example, the storage device 1258 can store historical data relating to different methods of the present disclosure or other aspects related to the embodiments of the present disclosure, among other things. The storage device 1258 can include a hard drive, an optical drive, a thumb-drive, an array of drives, or any combinations thereof.

Still referring to FIG. 12, a printer interface 1259 can also be connected to the alternate controller 1200 through the bus 1256 and adapted to connect the alternate controller 1200 to a printing device 1232, wherein the printing device 1232 can include a liquid inkjet printer, solid ink printer, large-scale commercial printer, thermal printer, UV printer, or dye-sublimation printer, among others. A network interface controller (NIC) 1234 is adapted to connect the alternate controller 1200 through the bus 1256 to a network 1236. The data or related data of embodiments or related to embodiments of the present disclosure, among other things, can be rendered on a display device, imaging device, and/or printing device via the network 1236.

Still referring to FIG. 12, the data or related data, among other things, can be transmitted over a communication channel of the network 1236, and/or stored within the storage system 1258 for storage and/or further processing. Further, the data or related data may be received wirelessly or wire from a receiver 1241 or transmitted via a transmitter 1243 wirelessly or wire, the receiver 1241 and transmitter 1243 are both connected to the alternate controller 1200 through the bus 1256.

The alternate controller 1200 may be connected to external sensors 1231, one or more input devices 1241, other computers 1242 and other devices 1244. The external sensors 1231 may include motion sensors, inertial sensors, a type of measuring sensor, etc. The external sensors 1231 may include sensors for, speed, direction, air flow, distance to an object or location, weather conditions, etc. The input devices 1241 can include, for example, a keyboard, a scanner, a microphone, a stylus, a touch sensitive pad or display.

Terms

In describing embodiments of the present disclosure, the following definitions are applicable throughout the present disclosure.

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. Vapor compression systems are used in applications beyond the conditioning of residential or commercial spaces. For example, vapor compression cycles can be used to cool computer chips in high-performance computing applications.

An "HVAC" system refers to any heating, ventilating, and air-conditioning (HVAC) system implementing the vapor compression cycle. HVAC systems span a broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing a pressure drop between the high-pressure and the low-pressure portions of the system, and an evaporating heat exchanger and a condensing heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

A "primary controller" is a compensator and a feedback loop that takes as input a set of measured primary system outputs and computes a set of primary system inputs to regulate the zone temperatures and a set of critical system variables to their set-points.

A "secondary controller" is a compensator and a feedback loop that takes as input a set of secondary system outputs and computes a set of secondary system inputs to drive the closed-loop system to the minimum power consumption in steady-state conditions.

A "critical process variable" is a measured or unmeasured variable of the vapor compression system that is important for proper operation, and may be regulated, such as a sub-cooling temperature in a condenser, or a superheat temperature in an evaporator, or the discharge temperature of the compressor.

The "primary control input vector" is a vector whose elements are a subset of the control inputs of the vapor compression system that is used by the primary controller.

The "secondary control input vector" is a vector whose elements include a subset of the control inputs of the vapor compression system that is used by the secondary controller, or a subset of the set-points of the primary controller.

The "primary system output vector" is vector whose elements include subset of measured variables of the vapor compression system that is used by the primary controller. It may also include set-points provided by the secondary controller as elements.

The "secondary system output vector" is a vector whose elements include a subset of measured variables of the vapor compression system that is used by the secondary controller. It may also include estimates of process variables that are provided by the primary controller.

An "electrical circuit" refers to an interconnection of wires that transmits electrical signals among components, such as processors, memory, or actuators.

A "set-point" refers to a desired or reference value of a variable, such as the room temperature. The term set-point is applied to any particular value of a specific set of variables.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "controller," "control system," and/or "regulator" refer to a device or a set of devices to manage, command, direct or regulate the behavior of other devices or systems. The controller can be implemented by hardware, a processor with operation configured by the software, and combination thereof. The controller can be an embedded system.

A "compensator" is an element of a controller, and refers to a realizable filter such as a proportional-integral (PI), proportional-integral-derivative (PID) or lead-lag type.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details.

For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A vapor compression system, comprising:
a set of primary actuators;
a set of secondary actuators;
a set of primary sensors providing a primary set of system outputs;
a set of secondary sensors providing a secondary set of system outputs;
a hardware memory includes executable programs and data;
a primary controller receives the primary set of system outputs, and produces a primary set of control inputs for the set of primary actuators, to regulate one or more zone temperatures to primary controller set-points and to regulate one or more critical process variables to the primary controller set-points; and
a secondary controller receives the secondary set of system outputs, and produces a secondary set of control inputs, to minimize an overall system power consumption, wherein the secondary controller uses an executable program of the executable programs from memory to compute a gradient of a power consumption function, a steady-state gain from the secondary control inputs to the secondary system outputs, and a compensator that includes integral action, and wherein some of the primary controller set-points are outputs of the secondary controller.

2. The vapor compression system of claim 1, wherein some of the secondary set of system outputs are obtained from a set of secondary estimates from the primary controller or from the set of secondary sensors.

3. The vapor compression system of claim 1, wherein the primary controller set-points are predetermined set-points set by a user, a environmental management system or a environmental controller.

4. The vapor compression system of claim 1, wherein the primary controller is a H-infinity loop-shaping controller.

5. The vapor compression system of claim 4, wherein the H-infinity loop-shaping controller is gain scheduled.

6. The vapor compression system of claim 1, wherein the secondary sensors includes the compressor speed and one or a combination of compression suction pressure, a compressor discharge pressure or an outdoor fan speed.

7. The vapor compression system of claim 1, wherein some primary sensors includes one or a combination of zone temperature measurements, heat exchanger temperature measurements or compressor temperature measurements.

8. The vapor compression system of claim 1, wherein some secondary actuators includes one or a combination of outdoor fan speed, condenser sub-cooling temperature set-point, evaporator super heat temperature set-point or compressor temperature set-point.

9. The vapor compression system of claim 1, wherein some primary actuators includes one or a combination of compressor speed or electronically actuated valve command.

10. The vapor compression system of claim 1, wherein the secondary controller produces the secondary set of control inputs, such that the secondary controller includes an inner product between the gradient of a power consumption function and the steady-state gain from the secondary control inputs to the secondary system outputs, integrated over time and multiplied by a feedback gain.

11. The vapor compression system of claim 1, wherein the executable program executed by the secondary controller uses the secondary set of system outputs to compute the gradient of the power consumption function, the steady-state gain from the secondary control inputs to the secondary system outputs, and the compensator including integral action.

12. The vapor compression system of claim 11, wherein the integral action includes one or a combination of a dead zone, anti-windup or saturation.

13. A method for vapor compression system, comprising:
receiving from a set of primary sensors, a primary set of system outputs by a primary controller, wherein the primary controller produces a primary set of control inputs for a set of primary actuators, to regulate one or more zone temperatures to primary controller set-points and to regulate one or more critical process variables to the primary controller set-points;
receiving from a set of secondary sensors, a secondary set of system outputs, by a secondary controller, wherein the secondary controller produces a secondary set of control inputs for a set of secondary actuators, to minimize an overall system power consumption, wherein the secondary controller uses an executable program stored in a memory, to compute a gradient of a power consumption function, a steady-state gain from the secondary control inputs to the secondary system outputs, and a compensator that includes integral action, and wherein some of the primary controller set-points are outputs of the secondary controller; and
outputting, via an output interface, the secondary set of control inputs to one or a combination of, some of the secondary actuators, or some of the primary controller set-points regulate the one or more zone temperatures.

14. The method of claim 3, wherein some of the secondary set of system outputs are obtained from a set of secondary estimates from the primary controller or from the set of secondary sensors.

15. The method of claim 13, wherein some of the primary controller set-points are predetermined set-points set by a user, a environmental management system or a environmental controller.

16. The method of claim 13, wherein some secondary sensors includes one or a combination of compression suction pressure, compressor discharge pressure, compressor speed or outdoor fan speed, and wherein some primary sensors includes one or a combination of zone temperature measurements, heat exchanger temperature measurements or compressor temperature measurements.

17. The method of claim 13, wherein the executable program executed by the secondary controller uses the secondary set of system outputs to compute the gradient of the power consumption function, the steady-state gain from the secondary control inputs to the secondary system outputs, and the compensator including integral action, and wherein the integral action includes one or a combination of a dead zone, anti-windup or saturation.

18. A method a non-transitory computer readable storage medium embodied thereon a program executable by a processor for performing a method, the method is for a vapor compression system, comprising:
receiving from a set of primary sensors via an input interface, a primary set of system outputs by a primary controller, wherein the primary controller in communication with the input interface produces a primary set of control inputs for a set of primary actuators, to regulate one or more zone temperatures to primary controller set-points and to regulate one or more critical process variables to the primary controller set-points;
receiving from a set of secondary sensors via the input interface, a secondary set of system outputs, by a secondary controller, wherein the secondary controller in communication with the input interface, produces a secondary set of control inputs for a set of secondary actuators, to minimize an overall system power consumption, wherein the secondary controller uses an executable program stored in a memory, to compute a gradient of a power consumption function, a steady-state gain from the secondary control inputs to the secondary system outputs, and a compensator that includes integral action, and wherein some of the primary controller set-points are outputs of the secondary controller; and
outputting, via an output interface, the secondary set of control inputs to one or a combination of, some of the secondary actuators, or some of the primary controller set-points to regulate the one or more zone temperatures.

19. A method for vapor compression system, comprising:
receiving from a set of primary sensors, a primary set of system outputs by a primary controller, wherein the primary controller produces a primary set of control inputs for a set of primary actuators, to regulate one or more zone temperatures to primary controller set-points and to regulate one or more critical process variables to the primary controller set-points;
receiving from a set of secondary sensors, a secondary set of system outputs, by a secondary controller, wherein the secondary controller produces a secondary set of control inputs for a set of secondary actuators, to minimize an overall system power consumption, wherein the secondary controller uses an executable program stored in a memory, to compute a gradient of a power consumption function, a steady-state gain from the secondary control inputs to the secondary system outputs, and a compensator that includes integral action, such that the secondary controller produces the secondary set of control inputs based on an an inner product between the gradient of the power consumption function and the steady-state gain from the secondary control inputs to the secondary system outputs, integrated over time and multiplied by a feedback gain; and outputting, via an output interface, the secondary set of control inputs to one or a combination of, some of the secondary actuators, or some of the primary controller set-points regulate the one or more zone temperatures.

\* \* \* \* \*